United States Patent
Zhu et al.

(10) Patent No.: US 12,518,743 B1
(45) Date of Patent: Jan. 6, 2026

(54) COMPUTER-IMPLEMENTED MULTISCALE MULTIMODAL TRANSFORMER FOR MULTIMODAL ACTION RECOGNITION

(71) Applicant: Amazon Technologies, Inc., Seattle, WA (US)

(72) Inventors: Wentao Zhu, Redmond, WA (US); Keval Doshi, Seattle, WA (US); Robert Ramsey, Seattle, WA (US); Xiaolong Wang, Campbell, CA (US); Mohamed Kamal Omar, Seattle, WA (US); Ahmed Aly Saad Ahmed, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 428 days.

(21) Appl. No.: 18/078,554

(22) Filed: Dec. 9, 2022

Related U.S. Application Data

(60) Provisional application No. 63/410,594, filed on Sep. 27, 2022.

(51) Int. Cl.

| | |
|---|---|
| *G10L 15/08* | (2006.01) |
| *G06N 20/00* | (2019.01) |
| *G06N 20/20* | (2019.01) |
| *G06T 9/00* | (2006.01) |
| *G10L 15/02* | (2006.01) |
| *G10L 21/04* | (2013.01) |
| *G10L 21/10* | (2013.01) |

(52) U.S. Cl.
CPC ............. *G10L 15/08* (2013.01); *G06N 20/00* (2019.01); *G06N 20/20* (2019.01); *G06T 9/002* (2013.01); *G10L 15/02* (2013.01); *G10L 21/04* (2013.01); *G10L 21/10* (2013.01)

(58) Field of Classification Search
CPC ......... G10L 15/08; G10L 21/04; G10L 21/10; G06N 20/20; G06N 3/02; G06N 3/08; G06T 5/60; G06T 9/00; G06T 9/002; G06T 9/004; G06T 2207/20084; G06T 2207/20081

See application file for complete search history.

(56) References Cited

U.S. PATENT DOCUMENTS

| | | | |
|---|---|---|---|
| 12,367,240 B1 * | 7/2025 | Zhu | G06N 3/08 |
| 2022/0277141 A1 * | 9/2022 | Nijkamp | G06F 40/295 |
| 2023/0068502 A1 * | 3/2023 | Pernias | G06V 10/454 |
| 2024/0161761 A1 * | 5/2024 | Islam | H04N 19/20 |

(Continued)

OTHER PUBLICATIONS

Kim et al, Multi-Scale Features for Transformer Model to improve the performance of sound event detection, Mar. 3, 2022, Applied Sciences 2022, 2626. (Year: 2022).*

(Continued)

*Primary Examiner* — Linda Wong
(74) *Attorney, Agent, or Firm* — NICHOLSON DE VOS WEBSTER & ELLIOTT LLP

(57) ABSTRACT

Techniques for implementing a multiscale multimodal transformer for multimodal action recognition with a computer are described. According to some examples, a computer-implemented method includes training a multiscale audio transformer (MAT) machine learning model to extract hierarchical audio representations; and generating an audio inference by the MAT machine learning model for an input audio file.

20 Claims, 16 Drawing Sheets
(8 of 16 Drawing Sheet(s) Filed in Color)

(56) References Cited

U.S. PATENT DOCUMENTS

2024/0282094 A1* 8/2024 Tsimpoukelli ......... G06V 10/80
2025/0209802 A1* 6/2025 Singh ..................... G10L 15/26

OTHER PUBLICATIONS

Karim et al, MED-VT: Multiscale encoder-decoder video transformer with application of object segmentation, Proceedings of IEEE/CVF Conference on Computer Vision and Pattern Recognition, 2023, pp. 6323-6333 (Year: 2023).*
Fan et al, Multiscale Vision Transformers, Proceedings of the IEEE/CVF International Conference on Computer Visions, Apr. 22, 2021, pp. 6824-6835 (Year: 2021).*
Neimark et al, Video Transformer Network, https://arxiv.org/abs/2102.00719, Aug. 17, 2021 (Year: 2021).*
John et al, Audio and Visual-based Emotion Recognition using Multimodal Transformers, 2022 26th International Conference on pattern Recognition (ICPR), Aug. 21-25, 2022, pp. 2852-2588 (Year: 2022).*
Gong, et al., "AST: Audio Spectrogram Transformer," Interspeech 2021, Aug. 2021, pp. 571-575.
Li, et al., "MViTv2: Improved Multiscale Vision Transformers for Classification and Detection," Proceedings of the IEEE/CVF Conference on Computer Vision and Pattern Recognition, Jun. 2022, pp. 4804-4814.
Nagrani et al., "Attention Bottlenecks for Multimodal Fusion—Supplementary Materials," Advances in Neural Information Processing Systems 34, Dec. 2021, pp. 1-7.

* cited by examiner

| Block | AST Feature | AST Arch./Param. | MAST Feature | MAST Arch./Param. |
|---|---|---|---|---|
| Input | 1×128×1024 | 0 | 1×128×1024 | 0 |
| Patch Embed. | 768×(1212=12×101) | 768×16×16×1 | 96×(8192=32×256) | 96×7×7×1 |
| Block {0, 1} | 768×1212 | Attn-MLP | 96×8192 | Attn-MLP |
| Block 2 | 768×1212 | Attn-MLP | 192×(2048=16×128) | MMSA-MLP |
| Block {3, 4} | 768×1212 | Attn-MLP | 192×2048 | Attn-MLP |
| Block 5 | 768×1212 | Attn-MLP | 384×(512=8×64) | MMSA-MLP |
| Block {6,...,11} | 768×1212 | Attn-MLP | 384×512 | Attn-MLP |
| Block 12 | 527 | 527×768 | 384×512 | Attn-MLP |
| Block {13,...,20} | - | - | 384×512 | Attn-MLP |
| Block 21 | - | - | 768×(256=8×32) | MMSA-MLP |
| Block {22,23} | - | - | 768×256 | Attn-MLP |
| Block 24 | - | - | 527 | 527×768 |

FIG. 6

(C) MULTISCALE MULTIMODAL TRANSFORMER (MMT)

COMPUTER-IMPLEMENTED MULTISCALE MULTIMODAL TRANSFORMER FOR MULTIMODAL ACTION RECOGNITION

CROSS-REFERENCE TO RELATED APPLICATIONS

This application claims the benefit of U.S. Provisional Patent Application Ser. No. 63/410,594, filed Sep. 27, 2022, which is incorporated herein by reference in its entirety.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

The patent or application file contains at least one drawing executed in color. Copies of this patent or patent application publication with color drawing(s) will be provided by the Office upon request and payment of the necessary fee.

Various examples in accordance with the present disclosure will be described with reference to the following drawings.

FIG. 6 is a table showing examples of blocks, features, and architecture/parameters of an audio spectrogram transformer (AST) model and a MAT (e.g., MAST) model according to some examples.

DETAILED DESCRIPTION

Figure 1:
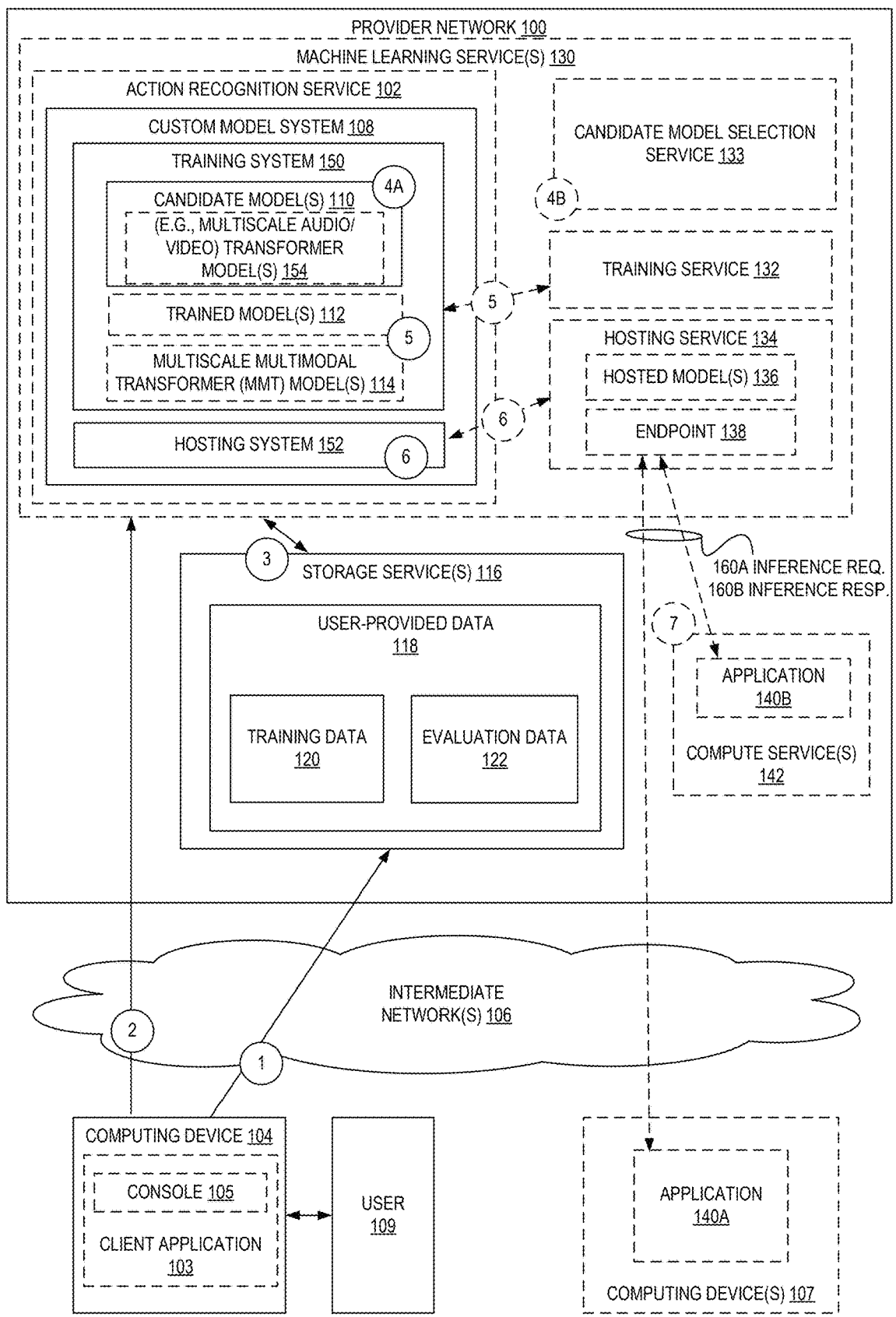
FIG. 1 is a diagram illustrating an environment for creating, training, and using a (e.g., multiscale multimodal transformer (MMT)) machine learning model according to some examples.

The present disclosure relates to methods, apparatus, systems, and non-transitory computer-readable storage media for training and using a multiscale audio transformer (MAT) model, e.g., as part of a multiscale multimodal transformer (MMT) model. In certain examples, an MAT model (e.g., as part of an MMT model) is used for (e.g., multimodal) action recognition. Examples herein are directed to computer-implemented (e.g., not human and not with pen-and-paper) training and use of an MAT model and/or MMT model.

Action recognition has many applications, e.g., automated video tagging and attribute classification, automated video policy violation detection and content rating, automated event detection in surveillance videos, etc. Examples herein leverage a hierarchy from dense and simple to coarse and complex feature learning, and propose a novel approach to audio recognition (e.g., referred to as multiscale audio transformer (MAT)). Examples herein are directed to a MAT model that employs hierarchical representational.

Audio can be efficiently perceived in a hierarchical structure, e.g., from audio signal per sampling time point to audio activities and categories for audio classification. Examples herein construct a MAT model (e.g., a multiscale audio spectrogram transformer (MAST) model) that employs hierarchical representation learning. In certain examples, an MAT model learns semantically (e.g., more) separable feature representations from audio signals. In certain examples, a MAT model is used for audio classification, e.g., and that classification may be used in one or more applications, such as, but not limited to, emotion and intent classification, event classification, and multimodal action and event classification.

Certain action recognition approaches merely leverage the video modality as opposed to humans that efficiently process video and audio cues simultaneously. This limits the usage of those "action recognition in video" models to applications where the actions are visually well-defined. On the other hand, audio and video can be perceived in a hierarchical structure, e.g., from audio signal per sampling time point to audio activities and the whole category in the audio classification.

Examples herein construct a multiscale multimodal transformer (MMT) with the designed multiscale audio transformer (MAT) and a multiscale video transformer (MVT), e.g., an MMT that employs hierarchical representation learning. To enable robust multimodal feature fusion, certain examples are directed to a set of multimodal supervised contrastive objectives (e.g., enhanced multimodal alignment loss function(s), audio-video contrastive loss (AVC), and intra-modality contrastive loss (IMC), (e.g., explicitly) that use label supervision, e.g., to specifically align the two modalities (e.g., audio and video) for robust multimodal representation fusion. In certain examples, MMT leverages an advanced audio model and inter-modality and/or intra-modality contrastive loss, to surpass any state-of-the-art approaches. Extensive ablation study and visualizations demonstrate the effectiveness of the proposed advanced multimodal transformers herein (e.g., MAT and/or MMT). Examples herein are directed to a multiscale multimodal transformer (e.g., MMT) that effectively learns discriminative features from a combination of audio and video signals by leveraging hierarchical feature extraction and advanced feature learning objectives. In certain examples, an MMT effectively capture (e.g., semantically more) separable feature representations from a combination of video and audio signals.

FIG. 1 is a diagram illustrating an environment for creating, training, and using a (e.g., multiscale multimodal transformer (MMT)) machine learning model according to some examples. FIG. 1 includes an action recognition service 102, one or more storage services 116, one or more machine learning services 130, and one or more compute services 142 implemented within a multi-tenant provider network 100. Each of the action recognition service 102, one or more storage services 116, one or more machine learning services 130, and one or more compute services 142 may be implemented via software, hardware, or a combination of both, and may be implemented in a distributed manner using multiple different computing devices.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 142), a storage service 116 that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console 105 implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

For example, in various examples, a "serverless" function may include code provided by a user or other entity-such as the provider network itself—that can be executed on demand. Serverless functions may be maintained within provider network 100 by an on-demand code execution service (which may be one of compute service(s) 142) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions (e.g., as an application 140B) that can be executed on demand, without requiring the user to maintain dedicated infrastructure to execute the serverless function. Instead, the serverless functions can be executed on demand using resources maintained by the provider network 100. In some examples, these resources may be maintained in a "ready" state (e.g., having a pre-initialized runtime environment configured to execute the serverless functions), allowing the serverless functions to be executed in near real-time.

The action recognition service 102, in some examples, is a machine learning powered service that makes it easy for users to understand, find insights in, and identify probable actions in files (e.g., video and audio multimedia data). For example, action recognition service 102 performs automated video tagging and attribute classification, automated video policy violation detection and/or content rating, and/or automated event detection in surveillance videos. In some examples, the action recognition service 102—via use of a custom model system 108—allows users to build and use a multiscale multimodal (MMT) model(s) 114 from trained model(s) 112 (e.g., from trained transformer model(s) 154). The custom model system 108, for example, may enable users to generate trained models 112 from candidate models 110 (e.g., candidate transformer model(s). In certain examples, (e.g., multiscale) (e.g., audio and/or video) transformer model(s) 154 is a deep learning model that adopts the mechanism of self-attention, e.g., differentially weighting the significance of each part of the input data. In certain examples, a transformer model is designed to process sequential input data, e.g., by processing the entire input all at once (e.g., not one word, frame, clip, etc. at a time). This improves the functioning of the model, e.g., by allowing for more parallelization and therefore reduces training times.

As discussed further below, a multiscale multimodal (MMT) model 114 may then be generated from a plurality of the trained models 112. Examples herein allow a customer to create trained models 112 (e.g., a trained MAT model) and/or a multiscale multimodal (MMT) model 114 by supplying data 118. This data 118 may include (e.g., labeled) training data 120 and evaluation data 122.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a plurality of candidate models 110 and respective configurations. Training may perform a grid search over the matrix of experiments (e.g., defined upfront) in search for the model and its parameters that performs best on the given dataset.

Thus, a user 109 may provide or otherwise identify data 118 (e.g., training data 120 and evaluation data 122) for use in creating a custom model. For example, as shown at circle (1), the user 109 may utilize a client application 103 executed by a computing device 104 (e.g., a web-application implementing a console 105 for the provider network 100, a standalone application, another web-application of another entity that utilizes the action recognition service 102 as a part of its backend, a database or mixed-SQL environment, etc.) to cause the computing device 104 to upload the data 118 to a storage location (e.g., provided by a storage service 116 such as an object storage service of a provider network 100).

The data 118 may be a columnar dataset that includes rows (or entries) of data values, where the data values may be arranged according to one or more columns (or attributes) and may be of a same datatype (e.g., one storing text). In some cases, the data 118 includes headings or other metadata describing names or datatypes of the columns, though in some cases this metadata may not exist. For example, some or all of the data 118 may have been provided by a user as a plaintext file (e.g., a comma-separated values (CSV) or tab-separated values (TSV) file), an exported database table or structure, an application-specific file such as a spreadsheet, etc.

For example, when a user 109 desires to train a classifier candidate model 110, this file (or files) may be a CSV with at least two values per row—e.g., one column storing documents (e.g., an amount of text ranging from a few characters to many words, sentences, paragraphs, etc.), and another column storing labels corresponding to the documents—e.g., "label, Text of document 1", where a label could be a valid UTF-8 string corresponding to a desired class to be detected.

Thereafter, at circle (2) the computing device 104 may issue one or more requests (e.g., API calls) to the machine learning service 130 that indicate the user's 109 desire to train a plurality of candidate models 110 into trained models 112, e.g., and create one or more multiscale multimodal (MMT) models 114 from the trained models 112. The request may be of a type that identifies which type of models are to be created or identifies that the machine learning service 130 itself is to identify the candidate models 110. The request may also include one or more of an identifier of a storage location or locations storing the data 118 (e.g., an identifier of the training data 120 and evaluation data 122), which may identify a storage location (e.g., via a Uniform Resource Locator (URL), a bucket/folder identifier, etc.) within the provider network 100 (e.g., as offered by a storage service 116) or external to the provider network 100, a format identifier of the data 118, a language identifier of the language of the data 118, etc. In some examples, the request includes an identifier (e.g., from the user 109) of the candidate models 110 themselves within the request.

Responsive to receipt of the request, the custom model system 108 of the machine learning service 130 is invoked and begins operations for training the corresponding type of model. For example, the custom model system 108 may identify what type of model is to be trained (e.g., via analyzing the method call associated with the request), the storage location(s) associated with the data 120, 122, etc. Thus, the custom model system 108 may retrieve any stored data 118 elements as shown at circle (3), which may be from a storage location within the provider network 100 or external to the provider network 100.

In some examples, the training (at circle (4A)) of the candidate models 110 includes use (at optional, dotted circle (4B)) of a separate candidate model selection service 133 that selects a proper subset of candidate models from a plurality of candidate models 110 for training by training service 132 of machine learning service 130 described herein to perform a particular training job (e.g., hyperparameter optimization tuning job), or the like; similarly, the hosting system 152 of the custom model system 108 may make use (at optional, dotted circle (6)) of a hosting service 134 of a machine learning service 130 to deploy a model as a hosted model 136 in association with an endpoint 138 that can receive inference requests from client applications 140A and/or 140B at circle (7), provide the inference requests 160A to the associated hosted model(s) 136, and provide inference results 160B (e.g., predicted classes, predicted entities, predicted events, etc.) back to applications 140A and/or 140B, which may be executed by one or more computing devices 107 outside of the provider network 100 or by one or more computing devices of a compute service 142 (e.g., hardware virtualization service, serverless code execution service, etc.) within the provider network 100. Candidates model(s) 110 may include MAT and MMT model(s) discussed herein.

Several visual recognition tasks are improved by using annotated datasets and certain machine learning architectures. However, unlike humans that have an innate ability to combine data from various modalities, certain deep learning-based approaches are largely dependent on visual cues as an information source. In order to achieve human-level perception and improve accuracy, an action recognition framework should be able to construe and rationalize information from multiple modalities.

Figure 2:
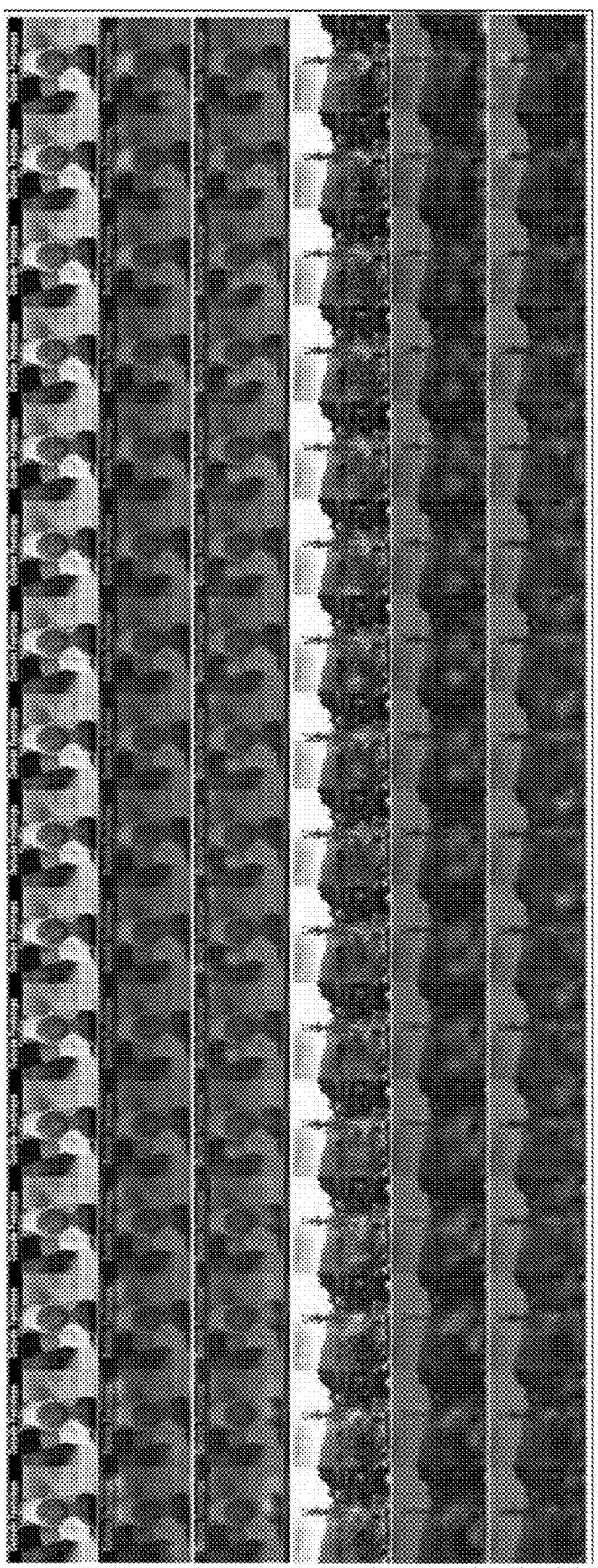
FIG. 2 illustrates two example multimedia files (e.g., frames thereof) of (1) footsteps on snow (the 1st-3rd rows, with the 2nd row illustrating a wrong prediction of a video only model and the 3rd row illustrating a more accurate prediction of a multimodal model) and (2) a volcano explosion (the 4th-6th rows, with the 5th row illustrating a wrong prediction of a video only model and the 6th row illustrating a more accurate prediction of a multimodal model) according to some examples.

FIG. 2 illustrates two example multimedia files (e.g., frames thereof) of (1) footsteps on snow (the 1st-3rd rows, with the 2nd row illustrating a wrong prediction of a video only model and the 3rd row illustrating a more accurate prediction of a multimodal model) and (2) a volcano explosion (the 4th-6th rows, with the 5th row illustrating a wrong prediction of a video only model and the 6th row illustrating a more accurate prediction of a multimodal model) according to some examples. More particularly, FIG. 2 depicts footsteps on snow (the 1st row) and a volcano explosion (the 4th row) where a model that only takes as input the video (e.g., and not the corresponding audio) wrongly predicts this clip includes a female singing (the 2nd row) and fireworks banging (the 5th row). Combining the audio signal, multimodal (e.g., video and audio) model obtains the accurate predictions and focuses on the shoes (the 3rd row) instead of text in the picture (the 2nd row) and the mountains (the 6th row) instead of red lava (the 5th row) in the GradCAM visualizations. In certain examples, relying on visual information alone is not sufficient and can lead to misclassifications. Examples herein are directed to a unified (e.g., MMT) architecture that is able to process multiple modalities for multimedia (e.g., video with audio) classification.

In certain examples, understanding videos essentially implies learning efficient spatio-temporal representations from videos, which is a fundamental task in computer vision. Certain computer vison works primarily employ 3D convolutional models that suffer from several shortcomings. Particularly, inductive biases like local connection, translation invariance, and a locally constrained receptive field substantially restrict the learning ability of convolutional models on large (e.g., huge) datasets. Certain examples herein utilize transformer-based architectures. Certain examples employ the transformer architecture directly to videos, e.g., but this is computationally inefficient in certain examples. Certain examples pool the attention to overcome the computational cost involved and achieved the best action recognition accuracy.

Certain examples utilize self-supervised feature learning, e.g., to fully exploit the data distribution property and reduce the effect of noisy label. In certain examples, multimodal (e.g., video and audio) inputs construct multiple views of one instance of a media file, e.g., using contrastive learning for multimodal signals. In certain examples, the self-supervised contrastive learning between multimodalities aligns the feature embedding and enhances the multimodal fusion. In certain examples, in the action recognition, examples herein improve multimodal contrastive learning by incorporating label supervision to learn discriminative multimodal feature embedding.

Examples herein are directed to a novel multimodal transformer-based approach to extract joint spatiotemporal and audio features from video and audio data sources, e.g., which learns multiscale hierarchical features in both audio and video transformer models. To enhance the learning efficiently in the multimodal Transformer, examples herein utilize an enhanced multimodal alignment loss function (referred to as audio-video contrastive learning), e.g., that aligns multimodal embedding from the same class (e.g., instead of previous the same instance). Examples herein incorporate label supervision into intra-modality contrastive learning. Certain examples herein are directed to a multimodal transformer (e.g., MMT and/or MAT) that outperforms other models by a large margin.

Examples herein are directed to a novel audio transformer (e.g., multiscale audio Transformer (MAT)) that leverages the multiscale hierarchical feature learning in audio signal recognition. In certain examples, MAT progressively increases the channel capacity of the intermediate latent sequence while reducing its temporal length for audio classification.

Examples herein are directed to a multiscale multimodal Transformer (MMT), that utilizes a MAT and a video transformer model. Examples herein (e.g., to learn compact and discriminative modality features for multimodal feature fusion) utilize an audio-video contrastive loss and intra-modality contrastive loss considering label supervision.

Figure 3:
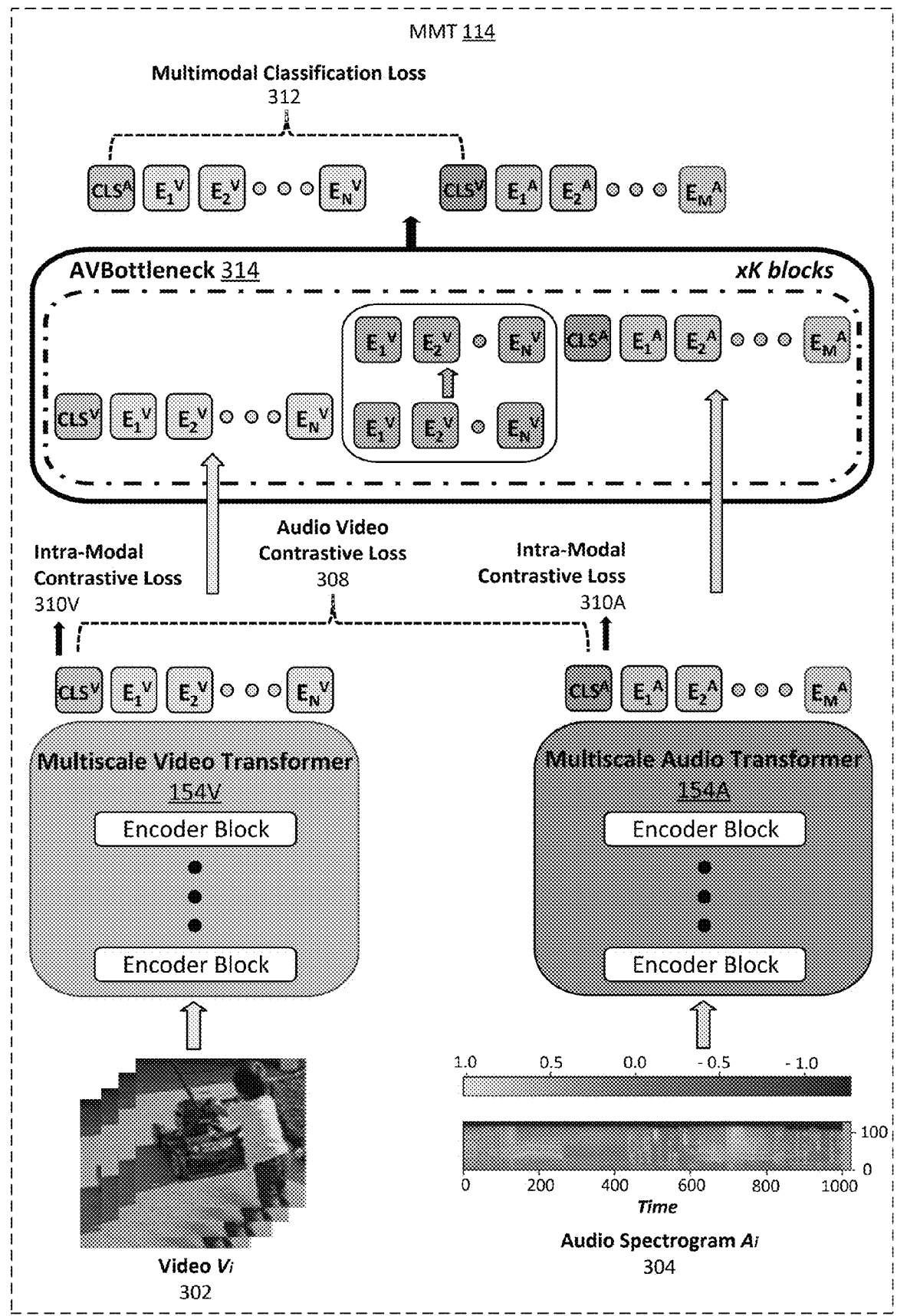
FIG. 3 is a diagram illustrating a multiscale multimodal transformer (MMT) machine learning model according to some examples.

FIG. 3 is a diagram illustrating a multiscale multimodal transformer (MMT) machine learning model 114 according to some examples. In certain examples, the framework in FIG. 3 is utilized as a multiscale multimodal Transformer (MMT), e.g., where multimodal inputs are sequence of frames $V_i$ 302 and audio spectrogram $A_i$ 304 from the i-th video. In certain examples, the multiscale audio Transformer (MAT), learns hierarchical features, for example, to model temporal audio signals effectively since the audio signal has the hierarchical structure naturally, e.g., ranging from signal at per time point to a voice activity segment and the whole audio representation. In certain examples, the framework builds multimodal audio-video MMT (e.g., bottleneck)

tokens, $E_1^F, \ldots, E_L^F$, to efficiently learn the cross-modality fusion alternatively from multiscale audio and video embeddings. In certain examples, the enhanced audio-video contrastive loss and intra-modality contrastive loss encourage learning compact and discriminative features. In certain examples, a service/system generates an audio spectrogram 304 for an (e.g., raw) input of audio (e.g., amplitude versus time), e.g., where the audio spectrogram is a representation of the spectrum of frequencies of an audio signal as it varies with time (e.g., frequency versus time). In certain examples, an audio spectrogram 304 is a melody ("mel") scale spectrogram, e.g., where the mel scale is a perceptual scale of pitches judged by listeners to be equal in distance from one another (e.g., in contrast to a hertz (Hz) scale. In certain examples, generating a mel spectrogram includes (i) separating the (e.g., raw) input audio signal (e.g., amplitude versus time), generating the Fast Fourier Transform (FFT) for each window to transform from time domain to frequency domain, generating a mel scale (e.g., take the entire frequency spectrum, and separate it into a number of (e.g., mels=128) evenly spaced frequencies (e.g., not spaced by distance on the frequency dimension, but by distance as it is heard by the human ear), and generating the mel spectrogram (e.g., for each window, decompose the magnitude of the signal into its components, corresponding to the frequencies in the mel scale).

In certain examples, learning effective audio-visual representations for video or audio classification is improved by leveraging the natural alignment between audio and visual data. In certain examples, audio-visual learning has several applications, e.g., video sound localization, audio-visual synchronization, person-clustering in videos, (e.g., visual) speech and speaker recognition, spotting of spoken keywords, audio synthesis using visual information, etc.

In certain examples, video is a natural source of multimodal data. In certain examples, multimodal self-supervised learning is achieved by predicting whether a video has correspondence with an audio stream, cross-modality clustering, and/or evolving losses. In certain examples, these approaches use a pretrained model to extract visual features from training videos and map them to a semantic space and hypothesize that a good robust generalization on the semantic space can lead to improved performance on unseen classes.

For extracting the visual features, certain approaches use a 3D convolutional neural network (3D-CNN). In certain examples, multimodal transformers use a vision transformer with a limited number of frames, e.g., eight frames, to extract visual features. In certain examples, for spatio-temporal (e.g., spatial and temporal) representation learning, certain models use various factorization methods along spatial- and temporal-dimensions. In certain examples, a video (e.g., only) model conducts a trade-off between resolution and the number of channels, and constructs a multi-scale Transformer to learn a hierarchy from simple dense resolution and fine-grained features to complex coarse features. Certain examples herein use advanced multiscale hierarchy feature learning for both audio and video, e.g., in the MMT.

Contrastive self-supervised learning can be used to align multimodal features from different views. Certain examples introduce intramodality contrastive learning into multimodal fusion and obtain better accuracy. Integrating label supervision into contrastive learning can further boost supervised learning. Certain examples enforce label discriminative cross-modality contrastive learning and intra-modality contrastive learning (e.g., instead of instance discriminative contrastive learning) in an MMT.

Example Multiscale Multimodal Transformer (MMT)

In certain examples, a multiscale multimodal Transformer (MMT) 114, e.g., as illustrated in FIG. 3, has three main components: (i) multiscale modality specific encoders (e.g., including multiscale audio Transformer 154A and multiscale video Transformer 154V), (ii) multi-modal fusion (e.g., via audio-video bottleneck (AVBottleneck)) transformer 314, and (iii) multimodal learning objectives (e.g., audio-video contrastive loss 308, intra-modality contrastive loss (e.g., 310V for video and 310A for audio), and/or multimodal supervised cross-entropy loss 312). In certain examples, multiscale audio Transformer 154A model includes one or more encoder blocks and/or multiscale video Transformer 154V model includes one or more encoder blocks.

First Example of a Multiscale Audio Transformer (MAT)

Figure 4:
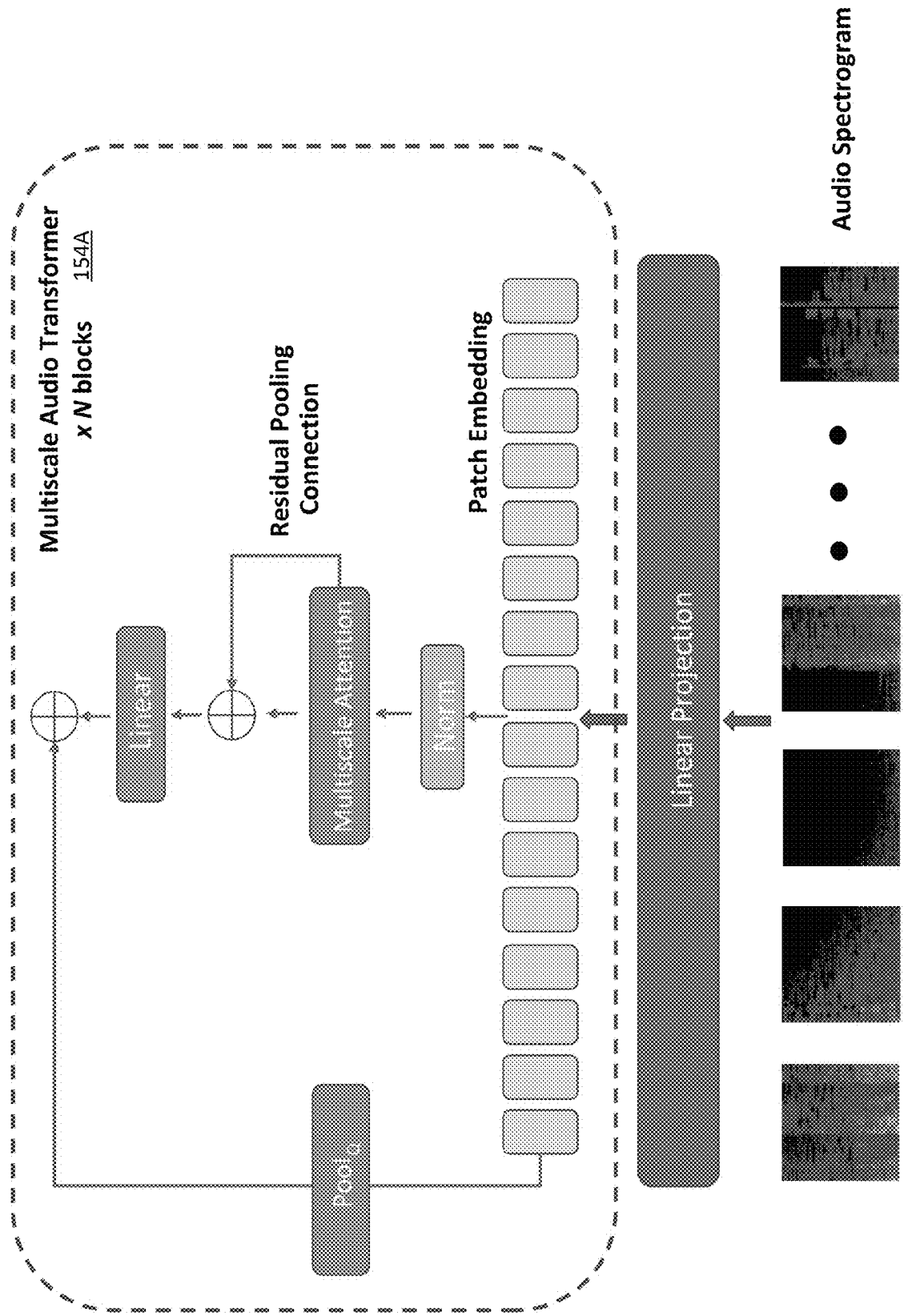
FIG. 4 is a diagram illustrating a block of a multiscale audio transformer (MAT) machine learning model of the MMT of FIG. 3 according to some examples.

FIG. 4 is a diagram illustrating a block of a multiscale audio transformer (MAT) machine learning model 154A of the MMT 114 of FIG. 3 according to some examples. In certain examples, the MAT uses a multiscale attention architecture, e.g., to effectively learn hierarchical audio representations.

In certain examples, audio signals can be perceived hierarchically, from each sampling time point, audio activities to audio classification category. Therefore, hierarchical learning from an audio spectrogram (e.g., which progressively reduces the temporal length and increases the channel dimensions) improves audio-based action recognition. Certain examples herein modify a multiscale vision transformer to construct a multiscale audio Transformer, e.g., with audio spectrogram $A \in R^{D \times T}$ as input, where D is the number of triangular frequency (e.g., mel-frequency) bins, and T is the temporal length. In certain examples, one encoder block of a multiscale audio Transformer (MAT) 154A in FIG. 4 is:

$$A_1 = \text{MHA}(\text{LN}(A)) + A, \text{Block}(A) = \text{MLP}(\text{LN}(A_1)) + A_1, \quad (1)$$

where A can be temporally residual pooling based intermediate audio features from the last block or input, LN performs a layer normalization, MHA performs a multi-headed attention (e.g., finds keys that matches the query, and gets the values of those keys), and MLP performs a multi-layer perceptron. In certain examples (e.g., in contrast with an audio spectrogram Transformer), MAT efficiently extract hierarchical features, which effectively models hierarchical characteristics of audio signals, e.g., and thus the MAT saves computing resources (e.g., floating-point operations per second (FLOPs)) and/or number of parameters significantly. In certain examples, the multiscale feature representation enables to use a large batch size for contrastive learning. In certain examples, a "mel" scale is constructed so that sounds of equal distance from each other, sound to humans as they are equal in distance from one another (e.g., in contrast to the Hertz (Hz) scale).

Second Example of a Multiscale Audio Transformer (Mat)

Figure 5:
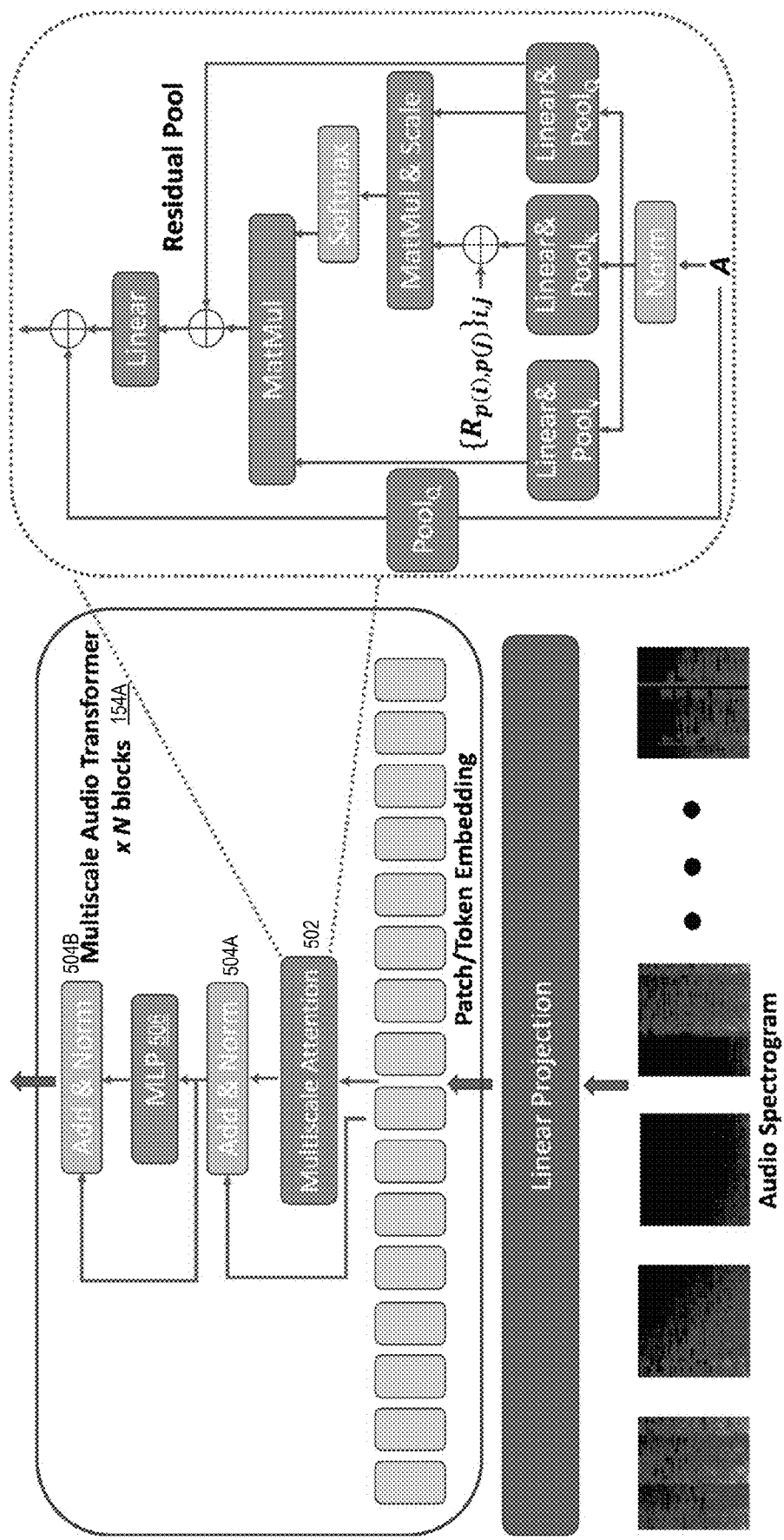
FIG. 5 is a diagram illustrating a block of an MAT machine learning model of the MMT of FIG. 3 according to some examples.

FIG. 5 is a diagram illustrating a block of an MAT machine learning model 154A of the MMT 114 of FIG. 3 according to some examples. In certain examples, the MAT uses a multiscale attention architecture, e.g., to effectively learn hierarchical audio representations.

In certain examples, audio signals can be perceived in a hierarchical structure, e.g., from a signal value at each sampling time point to audio activities and an audio classification category for the whole sequence. In certain examples, hierarchical representation learning from an audio spectrogram (e.g., where the model progressively reduces the temporal length and/or increases the channel dimensions) improves audio-based action recognition. Certain examples herein modify a multiscale vision transformer to construct a multiscale audio (e.g., spectrogram) Transformer, e.g., with audio spectrogram $A \in R^{D \times T}$ as input, where D is the number of triangular frequency (e.g., mel-frequency) bins, and T is the temporal length. In certain examples, one encoder block of a multiscale audio Transformer (MAT) 154A in FIG. 5 is:

$$A' = \text{MMSA}(\text{LN}(A)) + \mathcal{P}(A),$$

$$\text{Block}(A) = \text{MLP}(\text{LN}(A')) + A', \quad (2)$$

where A' can be temporally residual pooling based on intermediate audio features from the last block or input, LN performs a layer normalization ("norm" 504A and "norm" 504B), MMSA is a multi-headed multiscale self-attention 502 (e.g., finds keys that matches the query, and gets the values of those keys), MLP 506 performs a multi-layer perceptron, and $\mathcal{P}$ is a pooling operator.

In certain examples, one attention in a multihead multiscale self-attention 502 (MSAttn) is:

$$Q = \mathcal{P}_Q(AW_Q), K = \mathcal{P}_K(AW_K), V = \mathcal{P}_V(AW_V),$$

$$\text{MSAttn}(A) = Q + \text{Softmax}(QK^T + E^{(rel)}/\sqrt{d})V,$$

$$\text{where } E^{(rel)}_{i,j} = Q_i \cdot R_{p(i),p(j)} = Q_i(R_{t(i),t(j)}{}^t + R_{f(i),f(j)}{}^f) \quad (3)$$

and where $R^t$ and $R^f$ are positional embeddings along the temporal and feature axes, d is the embedding dimension, Softmax is a normalized exponential function (e.g., that normalizes a set of input values between 0 and 1 and causes a sum of those normalized values to be 1), $R_{p(i),p(j)}$ is relative position embedding, MatMul is matrix multiplication, Q is a query (e.g., tensor), K is a key (e.g., tensor), and V is a value (e.g., tensor).

In certain examples, the multihead multiscale self-attention (MMSA) is stacked to construct the multiscale audio (e.g., spectrogram) transformer (MAT) (e.g., MAST) (MAST) for audio classification. To explicitly demonstrate example details of network architecture, Table 1 in FIG. 6 compares an audio spectrogram transformer (AST) with an example MAT model (e.g., MAST model) according to this disclosure.

FIG. 6 is a table showing examples of blocks, features, and architecture/parameters of an audio spectrogram transformer (AST) model and a MAT (e.g., MAST) model according to some examples. Particularly, the MAT (e.g., MAST) model) reduces the number of parameters (e.g., and thus the processing time) for the MAT (e.g., MAST) in comparison to the AST model. In the depicted example, the patch embedding includes 8192 features, and this is parsed down to 2048 features in block 2 (e.g., divided by four), and this is parsed down to 512 features in block 5, etc. In the depicted example, in block 21, the pooling for MAT (e.g., MAST) is conducted on the time dimension to retain 8 dimensions of spectrogram features, compared with 12 dimensions in AST. Thus, in comparison to AST, examples of MAT (e.g., MAST) efficiently extract representation that effectively models hierarchical characteristics of audio signals, e.g., by significantly reducing the number of parameters and processing resources (e.g., multiply-accumulate (MAC) operations) used. Thus, examples of MAT (e.g., MAST) are efficient and light-weighted and can be used as a component in multimodal networks.

Audio-Video Contrastive Learning

In certain examples, multimodal (e.g., audio-based and corresponding video-based) inputs can be considered as different views for the same instance in the contrastive learning (e.g., naturally). In certain examples, cross-modality contrastive learning aligns inter-modalities features, which benefits the following cross-modality fusion. In certain examples, the cross-modality alignment contrastive learning is enhanced by considering label supervision to learn compact and discriminative features.

In certain examples, the multiscale audio Transformer (MAT) generates audio embeddings $E_{CLS}^A, E_1^A, \ldots, E_M^A$, where M is the number of audio tokens (e.g., embedding tokens) and the multiscale video Transformer (MVT) generates video embeddings $E_{CLS}^V, E_1^V, \ldots, E_N^V$, where N is the number of video tokens (e.g., embedding tokens). In certain examples, the audio-video contrastive loss (e.g., used to train one or more models) is:

$$\mathcal{L}_{AVC} = -\mathbb{E}_{(A,V) \in D}\left[y_{AV}\log\frac{\exp((g_A(E_{CLS}^A)^T g_V(E_{CLS}^V))/\tau)}{\sum_{(A,V) \in D}\exp((g_A(E_{CLS}^A)^T g_V(E_{CLS}^V))/\tau)}\right], \quad (4)$$

where D is the multimodal input that consists of audio A and video V, $y_{AV}$ is the indicator that the current A and V are from the same category or not, $\tau$ is a temperature parameter (e.g., fixed as 0:07 in certain examples), gA and gV are linear embedding layers of multiple dimensions (e.g., 256) for audio representation $E_{CLS}^A$ and video representation $E_{CLS}^V$, respectively. In certain examples, the dot product $gA(\bullet)^T gV(\bullet)$ measures the similarity of audio and video embedding, and the audio-video contrastive learning $L_{AVC}$ decreases the distribution divergence of audio and video features for the same category, which enhances the following cross-modality feature learning. Referring to FIG. 3, in certain examples, the MAT model 154A is to output a (e.g., classification) embedding vector $E_{CLS}^A$ and a set of audio representations (e.g., embedding tokens $E_1^A, \ldots, E_M^A$; where A indicates audio) (e.g., patch). Referring to FIG. 3, in certain examples, the MVT model 154B is to output a (e.g., classification) embedding vector $E_{CLS}^V$ and a set of video representations (e.g., embedding tokens $E_1^V, \ldots, E_N^V$; where V indicates video) (e.g., patch). In certain examples, these outputs are used by MMT 114 (e.g., by AVBottleneck transformer 314) to generate an inference, e.g., as discussed herein.

Intra-Modality Contrastive Learning

In certain examples, a cross-modality fusion can also benefit from compact intra-modality embeddings. Certain examples employ multiviews from data augmentation to construct intra-modality contrastive loss. Certain examples herein include label discriminative supervision into intra-modality contrastive loss (e.g., used to train one or more models), e.g., $$\mathcal{L}_{IMC}^V = -\mathbb{E}_{(V_1,V_2) \in D}\left[y_{V_1 V_2}\log\frac{\exp((g_V(E_{CLS}^{V_1})^T g_V(E_{CLS}^{V_2}))/\tau)}{\sum_{(V_1,V_2) \in D}\exp((g_V(E_{CLS}^{V_1})^T g_V(E_{CLS}^{V_2}))/\tau)}\right], \quad (5)$$

$$\mathcal{L}_{IMC}^A = -\mathbb{E}_{(A_1,A_2) \in D}\left[y_{A_1 A_2}\log\frac{\exp((g_A(E_{CLS}^{A_1})^T g_A(E_{CLS}^{A_2}))/\tau)}{\sum_{(A_1,A_2) \in D}\exp((g_A(E_{CLS}^{A_1})^T g_A(E_{CLS}^{A_2}))/\tau)}\right],$$

where $yV_1 V_2$ is the indicator that the current $V_1$ and $V_2$ are from the same category (e.g., car honking, dog barking, etc.) or not, and $yA_1 A_2$ is the indicator that the current $A_1$ and $A_2$ are from the same category (e.g., car honking, dog barking, etc.) or not. In certain examples, the enhanced intra-modality contrastive loss enables the learning of discriminative and compact modality embeddings.

Learning from Multimodal Video

In certain examples, a cross-modality transformer (e.g., MMT 114) causes the concatenation of multimodal embeddings and/or exchanges the key and value matrices between two modalities. In certain examples (e.g., due to huge graphics processing unit (GPU) memory consumption of a video Transformer), an audio-video (e.g., bottleneck) Transformer (e.g., AVBottleneck) is utilized which handles varied lengths of modality tokens efficiently, e.g., as illustrated in FIG. 3. Let $\{E_1^F, \ldots, E_L^F\}$ be the initial multimodal (e.g., Bottleneck) tokens. In certain examples, the initial multimodal tokens are initialized to random values (e.g., between 0 and 1). Without loss of generality, certain examples herein omit the layer number in the denotation. In certain examples, one multimodal (e.g., bottleneck) Transformer (MMT) block is:

$$E^{VF} = [E_{CLS}^V, E_1^V, \ldots, E_N^V, E_1^F, \ldots, E_L^F],$$
$$\tilde{E}^{VF} = \text{MSA}(\text{LN}(E^{VF})) + E^{VF},$$

$$\hat{E}^{VF} = \text{MLP}(\text{LN}(\tilde{E}^{VF})) + \tilde{E}^{VF}, \quad E^{AF} = [E_{CLS}^A, E_1^A, \ldots, E_M^A, \hat{E}_1^F, \ldots, \hat{E}_L^F].$$

$$\tilde{E}^{AF} = \text{MSA}(\text{LN}(E^{AF})) + E^{AF}, \quad \hat{E}^{AF} = \text{MLP}(\text{LN}(\tilde{E}^{AF})) + \tilde{E}^{AF} \tag{6}$$

where multimodal tokens can be updated by averaging the multimodal tokens along each block. In certain examples, the multimodal (e.g., Bottleneck) tokens are concatenated with (i) the audio embedding vector $E_{CLS}^A$ and set of audio representations (e.g., embedding tokens $E_1^A, \ldots, E_M^A$; where A indicates audio) and (ii) the video embedding vector $E_{CLS}^V$ and set of video representations (e.g., embedding tokens $E_1^V, \ldots, E_N^V$; where V indicates video). In certain examples, the multimodal bottleneck Transformer can be stacked into K blocks. In certain examples, the output of the cross-modality transformer (e.g., AVBottleneck 314 and/or MMT 114) does not include the multimodal (e.g., Bottleneck) tokens, e.g., the output is the updated (i) the audio embedding vector $E_{CLS}^A$ and set of audio representations (e.g., embedding tokens $E_1^A, \ldots, E_M^A$; where A indicates audio) and (ii) the video embedding vector $E_{CLS}^V$ and set of video representations (e.g., embedding tokens $E_1^V, \ldots, E_N^V$; where V indicates video) generated by use of the multimodal (e.g., Bottleneck) tokens.

Computational complexity: in certain examples, the multimodal bottleneck Transformer reduces the computing complexity from $O((M+N)^2)$ in merged concatenation based multimodal attention to $O((M+L)^2) + O((N+L)^2) = O(M^2) + O(N^2)$ since $L \ll M, N$. In certain examples, the $O(M^2)$ is the complexity of video Transformer and $O(N^2)$ is the complexity of audio Transformer, where M and N are the numbers of tokens in the video Transformer and audio Transformer, respectively.

In certain examples, the multimodal classification is achieved by concatenating the video and audio embedding, $[E_{CLS}^V, E_{CLS}^A]$. In certain examples, a fully connected layer is constructed to yield the final action classification logits. In certain examples, the supervised multimodal loss is cross-entropy loss (e.g., used to train one or more models), e.g., $$\mathcal{L}_{CLS}^{AV} = -\frac{1}{n} \sum_{i=1}^{n} \sum_{c=1}^{C} [y_i(c) \log p_i^{AV}(c)], \tag{7}$$

where $p_i^{AV}(c)$ is the multimodal classification probability for the i-th video and label index c.

In certain examples, a hybrid loss consisting of multimodal video classification and advanced supervised multimodal contrastive learning objectives forces the multimodal Transformer to learn effectively from the training data, e.g., which greatly alleviates the data hungry pitfall to fit large model capacity in the Transformer:

$$\mathcal{L} = \mathcal{L}_{CLS}^{AV} + \lambda_1 \mathcal{L}_{AVC} + \lambda_2 \frac{(\mathcal{L}_{IMC}^V + \mathcal{L}_{IMC}^A)}{2}, \tag{8}$$

where $\lambda_1$, and $\lambda_2$ are hyperparameters to balance the loss terms in the training. In certain examples, the inference is consistent with the training, and the multimodal prediction $p^{AV}$ is used directly.

Figure 7:
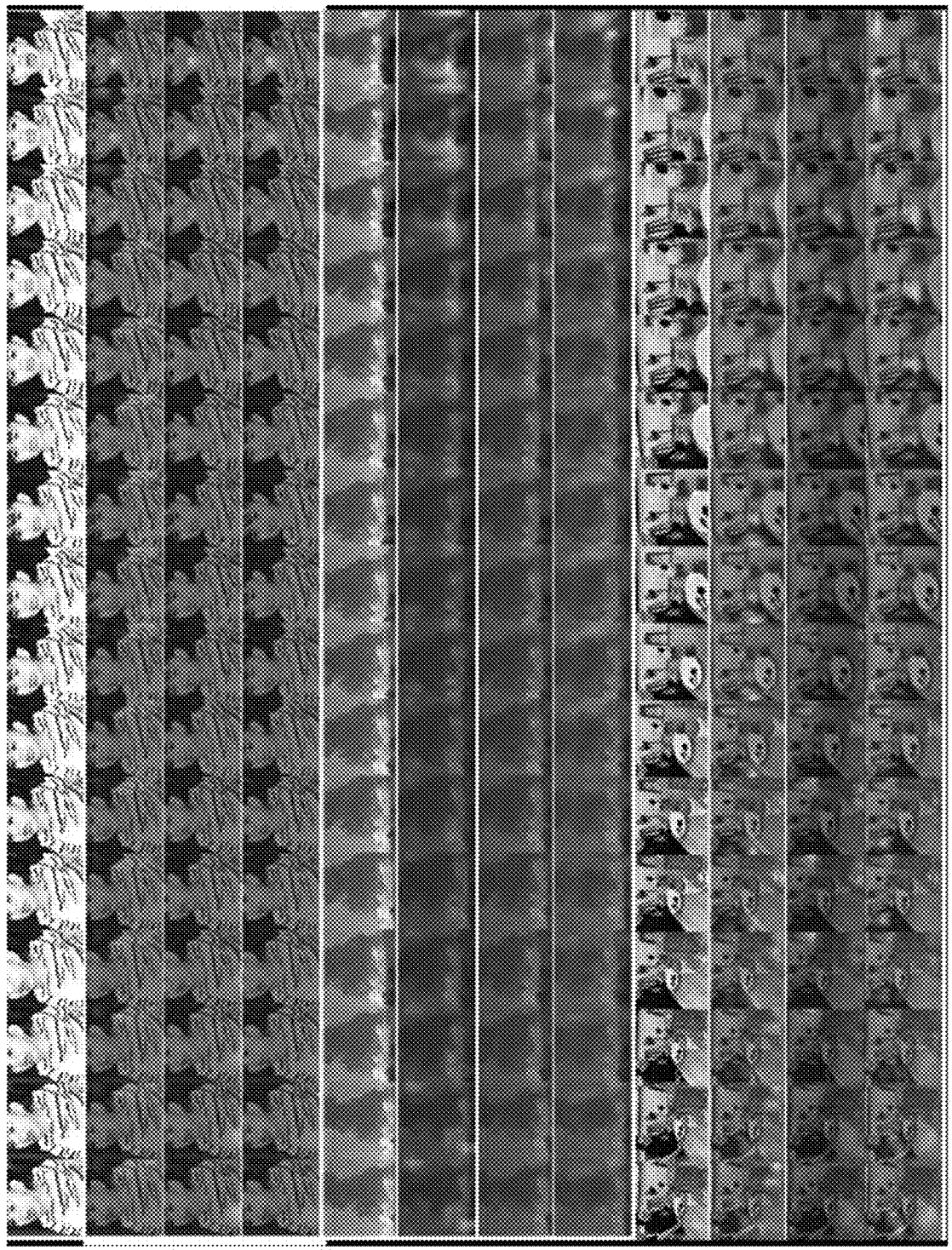
FIG. 7 illustrates three example multimedia files (e.g., frames thereof) with each respective set of four rows being (1) raw video, (2) Gradient-weighted Class Activation Mapping (GradCAM) of a video only model, (3) GradCAM of an audio-video bottleneck Transformer (AVBottleneck), and (4) GradCAM of an MMT model according to some examples.

FIG. 7 illustrates three example multimedia files (e.g., frames thereof) with each respective set of four rows being (1) raw video, (2) Gradient-weighted Class Activation Mapping (GradCAM) of a video only model, (3) GradCAM of an audio-video bottleneck Transformer (AVBottleneck), and (4) GradCAM of an MMT model according to some examples.

Example implementation details: certain examples employ 16 frames for multiscale video Transformer, the number of spatial crops as 3, and the number of ensemble views as 4 in the inference. Due to the efficiency of certain multiscale audio Transformers, certain examples employ batch size of 64. In certain examples, the numbers of AVBottleneck blocks K and tokens L are all set as 4. In certain examples, the AdamW optimization algorithm is used in the backpropagation and the learning rate is set as $1 \times 10^{-4}$. In certain examples, the number of epochs is set as 100. In certain examples, the $\lambda_1$ and $\lambda_2$ are set as 0.25, 0.25 for the first 20 epochs, 0.1, 0.1 from the 21- to 40-th epochs, 0.05, 0.05 after the 40-th epochs. In certain examples, these hyperparameters are generally set to tune the loss values into the same scale.

Visualizations: as an example, three test clips with category names of "baby crying", "volcano explosion", and "popping popcorn" from a test set are selected, and (as shown in FIG. 7) 16 frames of raw video, GradCAM of video only model, AVBottleneck, and the fully trained (e.g., trained with audio-video contrastive loss 308, intra-modality contrastive loss (e.g., 310V for video and/or 310A for audio), and/or multimodal supervised cross-entropy loss 312) MMT sequentially.

As an example: from the first test case (1st-4th rows) in FIG. 7, the video only model focuses on body and wrongly predicts this clip as "people screaming". With audio signal and advanced self-supervised learning, the full MMT model can align the audio and video well, focuses only on mouth of the baby and obtains the correct prediction. From the second test case (5-8th rows) in FIG. 7, AVBottleneck in the 7th row cannot capture the fog and mountain, and it wrongly predicts the clip as "mouse clicking". From the third case (9-12th rows) in FIG. 7, the video only model pays no attention to the popcorn machine and only pays attention to human and the background table and wrongly predicts the clip as "eating with cutlery" and MMT with audio signal and advanced loss function can fully understand the popcorn machine.

Figure 8:
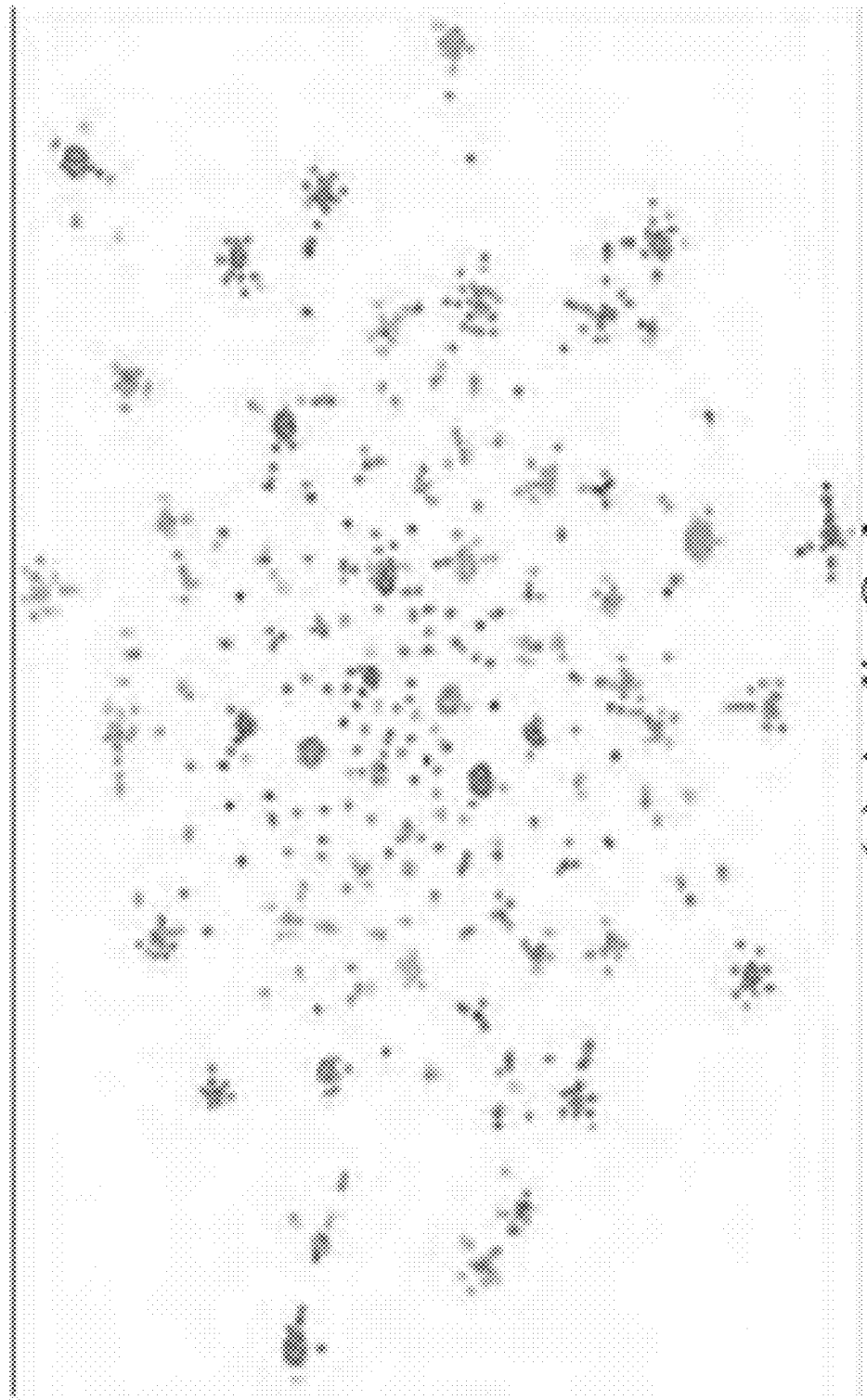
FIG. 8 is a diagram illustrating a t-distributed stochastic neighbor embedding (t-SNE) visualization of representations from an audio only model on a set of fifty categories of sounds from multimedia files according to some examples.
Figure 9:
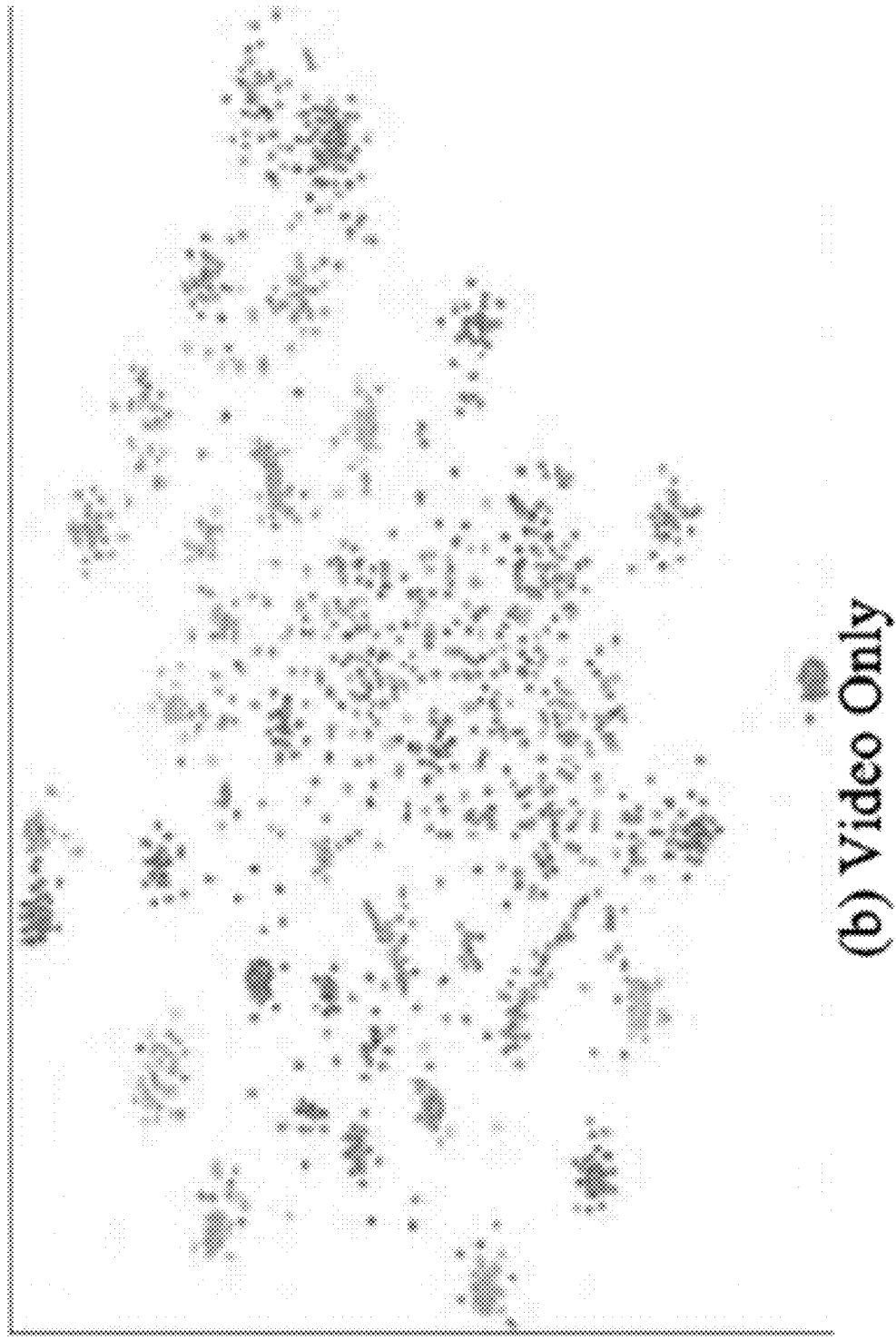
FIG. 9 is a diagram illustrating a t-SNE visualization of representations from a video only model on the set of fifty categories of sounds from FIG. 6 according to some examples.
Figure 10:
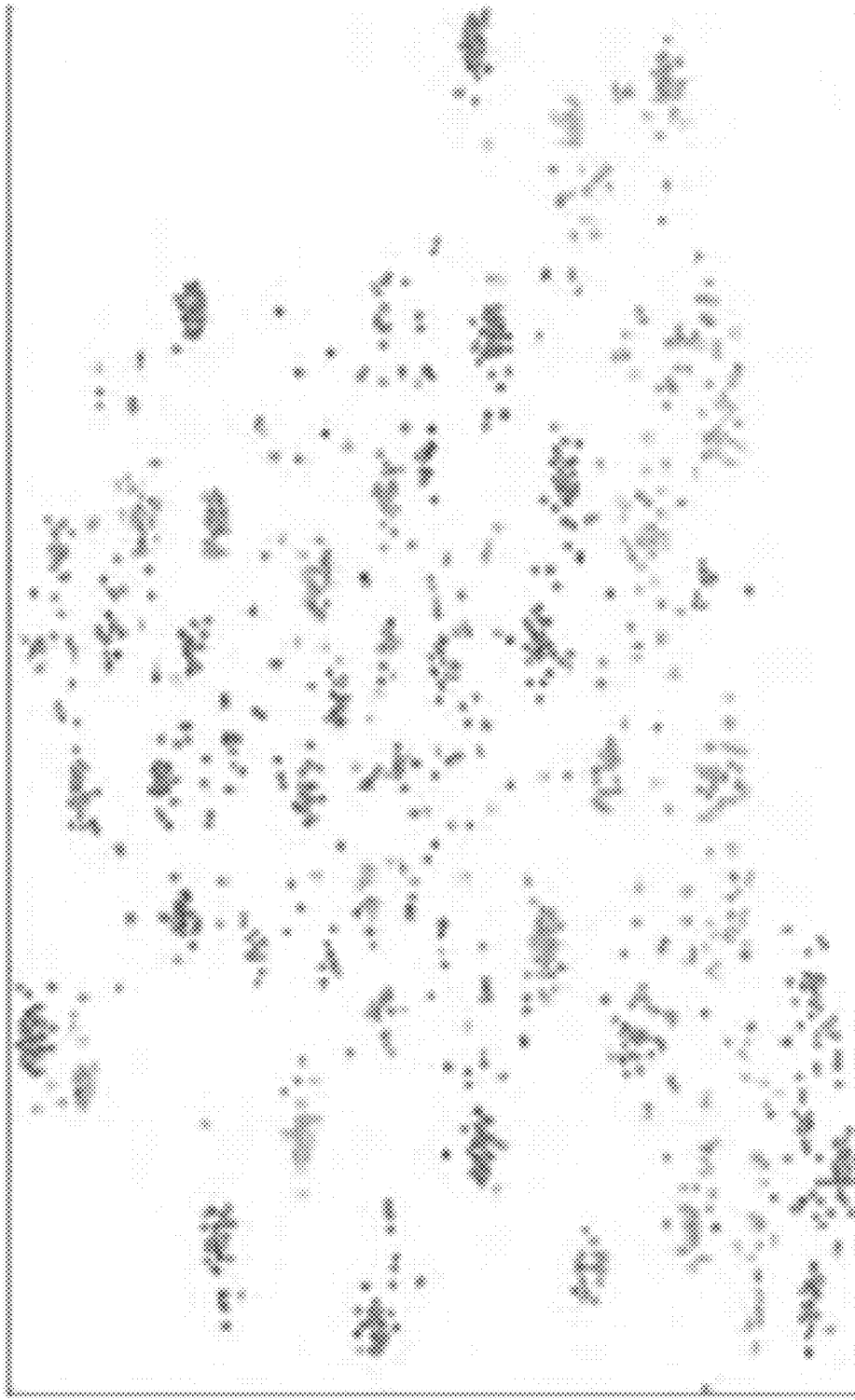
FIG. 10 is a diagram illustrating a t-SNE visualization of representations from an MMT model on the set of fifty categories of sounds from FIGS. 6 and 7 according to some examples.

FIG. 8 is a diagram illustrating a t-distributed stochastic neighbor embedding (t-SNE) visualization of representations from an audio only model on a set of fifty categories of sounds from multimedia files according to some examples. FIG. 9 is a diagram illustrating a t-SNE visualization of representations from a video only model on the set of fifty categories of sounds from FIG. 8 according to some examples. FIG. 10 is a diagram illustrating a t-SNE visualization of representations from an MMT model on the set of fifty categories of sounds from FIGS. 8 and 9 according to some examples.

Certain examples employ t-SNE to visualize the feature representation from the second to last layer in multiscale audio Transformer (a), multiscale video Transformer (b), and multiscale multimodal Transformer (c) on the dataset in FIG. 7. From these figures, it is shown that this examples of MMT learns a compact and discriminative representation.

Examples herein are directed to an effective multiscale audio Transformer (MAT) and multiscale multimodal Transformer (MMT), which firstly leverages advanced multiscale Transformer, audio-video contrastive loss function, and intra-modal contrastive loss. In certain examples, these supervised multimodal contrastive learning objectives enable compact and discriminative feature learning.

Figure 11:
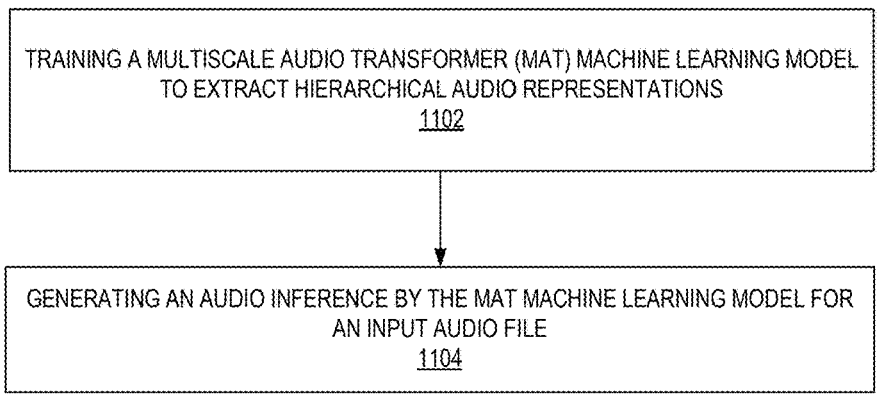
FIG. 11 is a flow diagram illustrating operations of a method of training and using a multiscale audio transformer (MAT) model according to some examples.

FIG. 11 is a flow diagram illustrating operations 1100 of a method of training and using a multiscale audio transformer (MAT) model according to some examples. Some or all of the operations 1100 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 1100 are performed by a provider network 100 or device (e.g., device 1500) of the other figures.

The operations 1100 include, at block 1102, training a multiscale audio transformer (MAT) machine learning model to extract hierarchical audio representations. The operations 1100 further include, at block 1104, training generating an audio inference by the MAT machine learning model for an input audio file.

Exemplary environments, systems, etc. that the above may be used in are detailed below.

At least some examples of the disclosed technologies can be described in view of the following examples:

Example 1. A computer-implemented method comprising:
   training a multiscale audio transformer (MAT) machine learning model to extract hierarchical audio representations; and
   generating an audio inference by the MAT machine learning model for an input audio file.

Example 2. The computer-implemented method of example 1, wherein the input audio file is an audio spectrogram.

Example 3. The computer-implemented method of example 1, further comprising generating a video inference by a multiscale video transformer (MVT) machine learning model for an input video file corresponding to the input audio file.

Example 4. The computer-implemented method of example 3, further comprising performing an action recognition on the input audio file and the input video file based on the audio inference and the video inference.

Example 5. The computer-implemented method of example 1, further comprising performing an action recognition on the input audio file based on the audio inference.

Example 6. A computer-implemented method comprising:
   receiving a request to train a multiscale audio transformer (MAT) machine learning model to extract hierarchical audio representations;
   training the MAT machine learning model to extract hierarchical audio representations;
   receiving a request to perform an action recognition on an audio file;
   generating a first plurality of audio representations by the MAT machine learning model for an input of an audio spectrogram of the audio file;
   generating a second plurality, less than the first plurality, of audio representations by the MAT machine learning model from the first plurality of audio representations;
   generating a classification embedding and a third plurality, less than the second plurality, of audio representations by the MAT machine learning model from the second plurality of audio representations; and
   performing the action recognition on the audio file based on the classification embedding and the third plurality of audio representations.

Example 7. The computer-implemented method of example 6, further comprising generating a video inference by a multiscale video transformer (MVT) machine learning model for a video file corresponding to the audio file.

Example 8. The computer-implemented method of example 7, wherein the performing the action recognition on the audio file and the video file is based on the classification embedding, the third plurality of audio representations, and the video inference.

Example 9. A computer-implemented method comprising:
   receiving a request to perform an action recognition on an audio file;
   generating a first plurality of audio representations by a multiscale audio transformer (MAT) machine learning model, trained to extract hierarchical audio representations, for an input of the audio file;
   generating a second plurality, less than the first plurality, of audio representations by the MAT machine learning model from the first plurality of audio representations; and
   performing the action recognition on the audio file based on the second plurality of audio representations.

Example 10. The computer-implemented method of example 9, wherein the input of the audio file is an audio spectrogram.

Example 11. The computer-implemented method of example 9, wherein the generating the second plurality of audio representations by the MAT machine learning model comprises reducing a temporal length of the first plurality of audio representations.

Example 12. The computer-implemented method of example 11, wherein the generating the second plurality of audio representations by the MAT machine learning model comprises increasing a channel dimension of the first plurality of audio representations.

Example 13. The computer-implemented method of example 9, wherein the generating the second plurality of audio representations by the MAT machine learning model comprises increasing a channel dimension of the first plurality of audio representations.

Example 14. The computer-implemented method of example 9, further comprising generating a video inference by a multiscale video transformer (MVT) machine learning model for a video file corresponding to the audio file.

Example 15. The computer-implemented method of example 14, wherein the performing the action recognition on the audio file and the video file is based on the second plurality of audio representations and the video inference.

Example 16. The computer-implemented method of example 14, wherein the generating the video inference comprises generating a plurality of video representations by the MVT machine learning model for the video file.

Example 17. The computer-implemented method of example 16, further comprising: generating a plurality of multimodal audio-video tokens;
  concatenating the plurality of multimodal audio-video tokens and the second plurality of audio representations as a first input;
  concatenating the plurality of multimodal audio-video tokens and the plurality of video representations as a second input; and
  generating an updated second plurality of audio representations and an updated plurality of video representations by a multiscale multimodal (MM) machine learning model from the first input and the second input, wherein the performing the action recognition on the audio file and the video file is based on the updated second plurality of audio representations and the updated plurality of video representations.

Example 18. The computer-implemented method of example 17, wherein the second plurality of audio representations comprise a set of embedding tokens and a classification embedding vector for the audio file and the plurality of video representations comprise a set of embedding tokens and a classification embedding vector for the video file.

Example 19. The computer-implemented method of example 9, wherein the second plurality of audio representations comprise a set of embedding tokens and a classification embedding vector for the audio file.

Example 20. A non-transitory computer-readable medium storing code that, when executed by a device, causes the device to perform a method comprising:
  receiving a request to perform an action recognition on an audio file;
  generating a first plurality of audio representations by a multiscale audio transformer (MAT) machine learning model, trained to extract hierarchical audio representations, for an input of the audio file;
  generating a second plurality, less than the first plurality, of audio representations by the MAT machine learning model from the first plurality of audio representations; and
  performing the action recognition on the audio file based on the second plurality of audio representations.

Example 21. The non-transitory computer-readable medium of example 20, wherein the generating the second plurality of audio representations by the MAT machine learning model comprises reducing a temporal length of the first plurality of audio representations.

Example 22. The non-transitory computer-readable medium of example 20, wherein the generating the second plurality of audio representations by the MAT machine learning model comprises increasing a channel dimension of the first plurality of audio representations.

Example 23. The non-transitory computer-readable medium of example 20, wherein the method further comprises generating a video inference by a multiscale video transformer (MVT) machine learning model for a video file corresponding to the audio file, and the performing the action recognition on the audio file and the video file is based on the second plurality of audio representations and the video inference.

Example 24. The non-transitory computer-readable medium of example 23, wherein the generating the video inference comprises generating a plurality of video representations by the MVT machine learning model for the video file, and the method further comprises: generating a plurality of multimodal audio-video tokens;
  concatenating the plurality of multimodal audio-video tokens and the second plurality of audio representations as a first input;
  concatenating the plurality of multimodal audio-video tokens and the plurality of video representations as a second input; and
  generating an updated second plurality of audio representations and an updated plurality of video representations by a multiscale multimodal (MM) machine learning model from the first input and the second input, wherein the performing the action recognition on the audio file and the video file is based on the updated second plurality of audio representations and the updated plurality of video representations.

Example 25. The non-transitory computer-readable medium of example 20, wherein the second plurality of audio representations comprise a set of embedding tokens and a classification embedding vector for the audio file.

Figure 12:
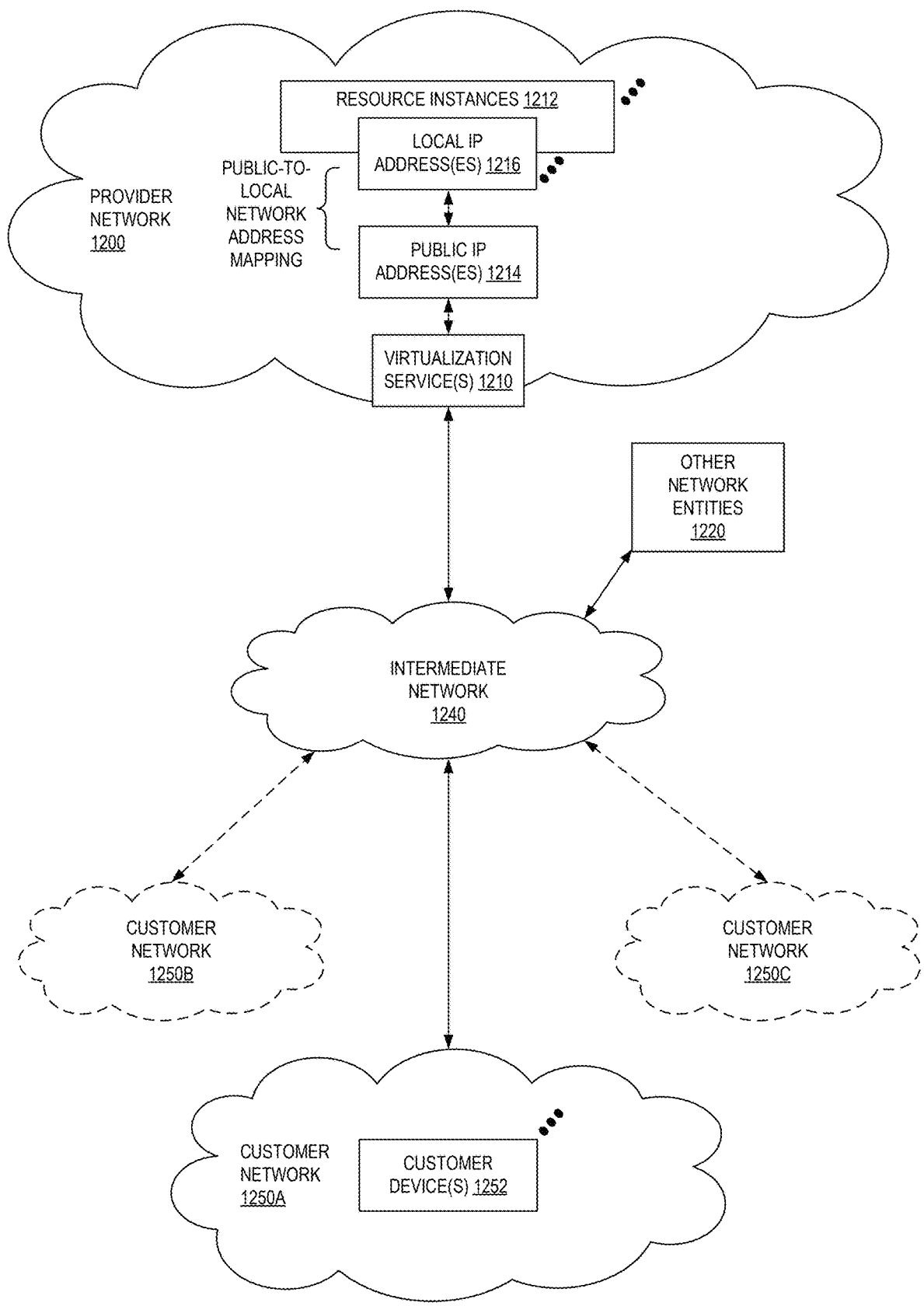
FIG. 12 illustrates an example provider network environment according to some examples.

FIG. 12 illustrates an example provider network (or "service provider system") environment according to some examples. A provider network 1200 may provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 may be associated with the resource instances 1212; the local IP addresses are the internal network addresses of the resource instances 1212 on the provider network 1200. In some examples, the provider network 1200 may also provide public IP addresses 1214 and/or public IP address ranges (e.g., Internet Protocol version 4 (IPv4) or Internet Protocol version 6 (IPv6) addresses) that customers may obtain from the provider 1200.

Conventionally, the provider network 1200, via the virtualization services 1210, may allow a customer of the service provider (e.g., a customer that operates one or more client networks 1250A-1250C including one or more customer device(s) 1252) to dynamically associate at least some public IP addresses 1214 assigned or allocated to the customer with particular resource instances 1212 assigned to the customer. The provider network 1200 may also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of customer network(s) 1250A-1250C may, for example, implement customer-specific applications and present the customer's applications on an intermediate network 1240, such as the Internet. Other network entities 1220 on the intermediate network 1240 may then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 1200; a customer may then assign their allocated public IP addresses to particular resource instances allocated to the customer. These public IP addresses may be referred to as customer public IP addresses, or simply customer IP addresses. Instead of being assigned by the provider network 1200 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
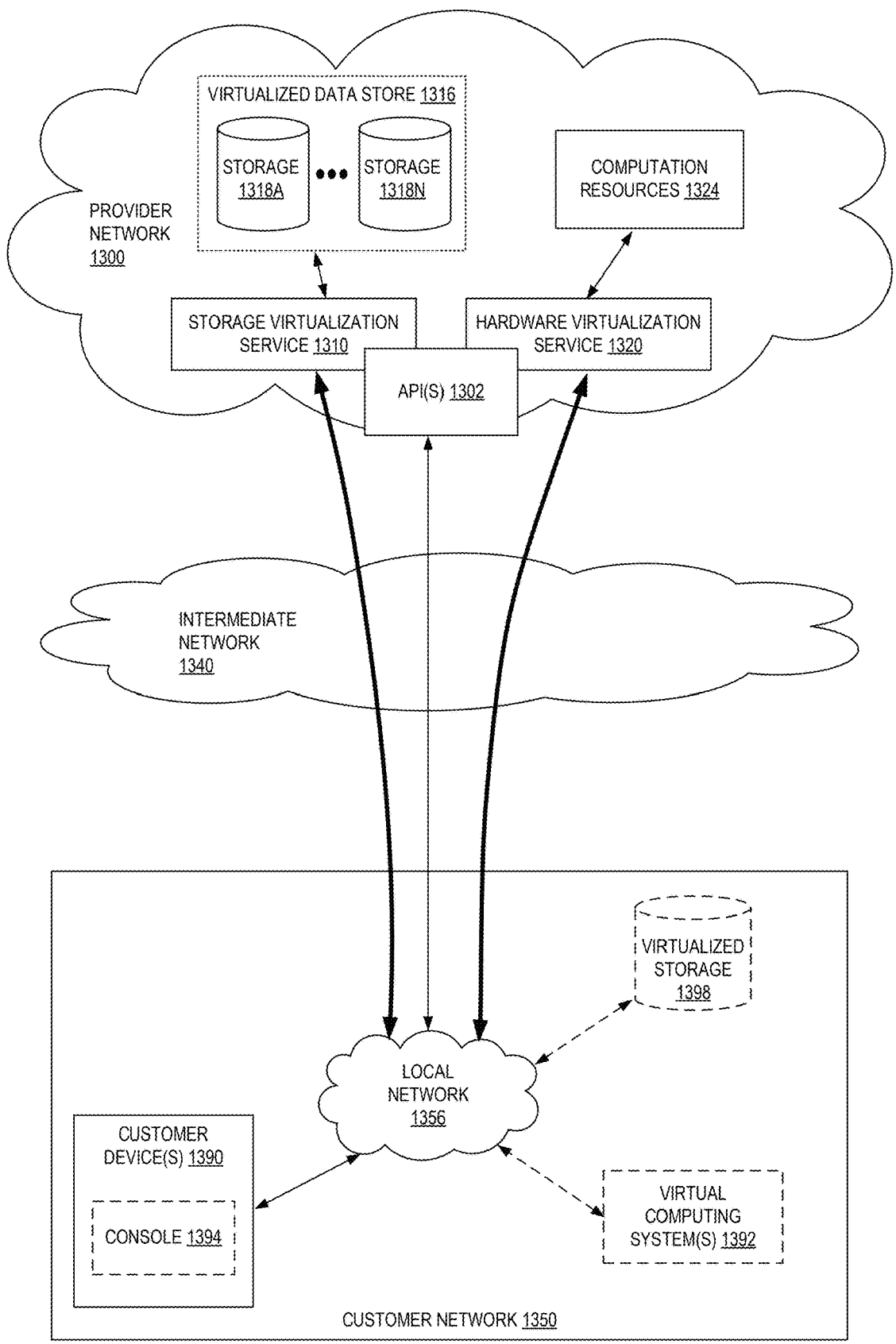
FIG. 13 is a block diagram of an example provider network that provides a storage service and a hardware virtualization service to customers according to some examples.

FIG. 13 is a block diagram of an example provider network that provides a storage service and a hardware virtualization service to customers, according to some examples. Hardware virtualization service 1320 provides multiple computation resources 1324 (e.g., VMs) to customers. The computation resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the computation resources 1324 to public Internet destinations, and from public Internet sources to the local IP addresses of computation resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some examples, hardware virtualization service 1320 may provide one or more APIs 1302, for example a web services interface, via which a customer network 1350 may access functionality provided by the hardware virtualization service 1320, for example via a console 1394 (e.g., a web-based application, standalone application, mobile application, etc.). In some examples, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage service 1310, for example via one or more APIs 1302, to access data from and store data to storage resources 1318A-1318N of a virtual data store 1316 (e.g., a folder or "bucket", a virtualized volume, a database, etc.) provided by the provider network 1300. In some examples, a virtualized data store gateway (not shown) may be provided at the customer network 1350 that may locally cache at least some data, for example frequently-accessed or critical data, and that may communicate with storage service 1310 via one or more communications channels to upload new or modified data from a local cache so that the primary store of data (virtualized data store 1316) is maintained. In some examples, a user, via a virtual computing system 1392 and/or on another customer device 1390, may mount and access virtual data store 1316 volumes via storage service 1310 acting as a storage virtualization service, and these volumes may appear to the user as local (virtualized) storage 1398.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.

Illustrative System

Figure 14:
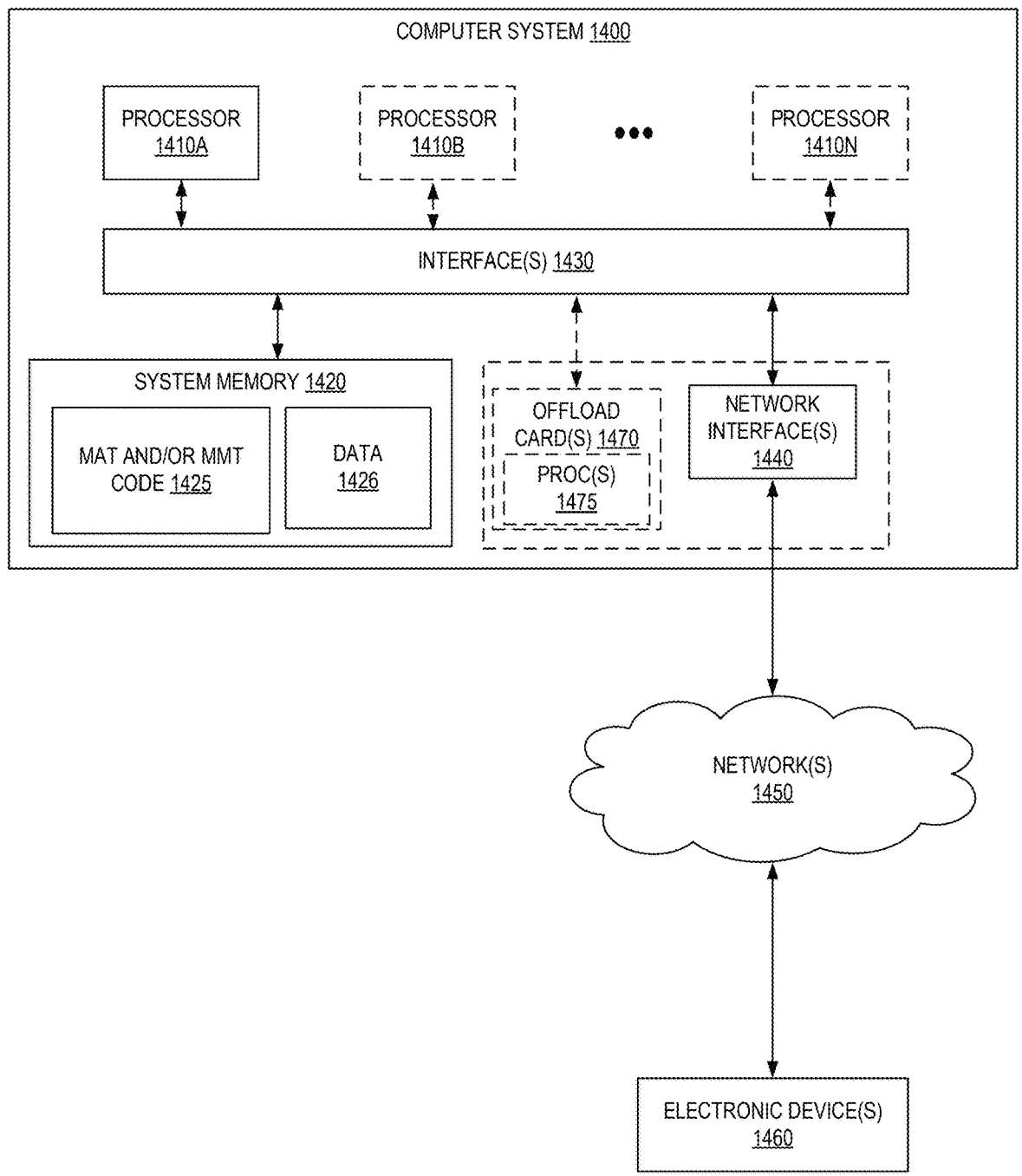
FIG. 14 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1400 illustrated in FIG. 14. In the illustrated example, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various examples a computer system 1400 may include one computing device or any number of computing devices configured to work together as a single computer system 1400.

In various examples, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various examples, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various examples, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1420 as MAT and/or MMT code 1425 (e.g., executable to implement, in whole or in part, the MAT model(s) and/or MMT model(s) or other operations discussed herein) and data 1426.

In one example, I/O interface 1430 may be configured to coordinate I/O traffic between processor 1410, system memory 1420, and any peripheral devices in the device, including network interface 1440 or other peripheral interfaces. In some examples, I/O interface 1430 may perform any necessary protocol, timing, or other data transformations to convert data signals from one component (e.g., system memory 1420) into a format suitable for use by another component (e.g., processor 1410). In some examples, I/O interface 1430 may include support for devices attached through various types of peripheral buses, such as a variant of the Peripheral Component Interconnect (PCI) bus standard or the Universal Serial Bus (USB) standard, for example. In some examples, the function of I/O interface 1430 may be split into two or more separate components, such as a north bridge and a south bridge, for example. Also, in some examples some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various examples, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1400 includes one or more offload cards 1470 (including one or more processors 1475, and possibly including the one or more network interfaces 1440) that are connected using an I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1400 may act as a host electronic device (e.g., operating as part of a hardware virtualization service) that hosts compute instances, and the one or more offload cards 1470 execute a virtualization manager that can manage compute instances that execute on the host electronic device. As an example, in some examples the offload card(s) 1470 can perform compute instance management operations such as pausing and/or un-pausing compute instances, launching and/or terminating compute instances, performing memory transfer/copying operations, etc. These management operations may, in some examples, be performed by the offload card(s) 1470 in coordination with a hypervisor (e.g., upon a request from a hypervisor) that is executed by the other processors 1410A-1410N of the computer system 1400. However, in some examples the virtualization manager implemented by the offload card(s) 1470 can accommodate requests from other entities (e.g., from compute instances themselves), and may not coordinate with (or service) any separate hypervisor.

In some examples, system memory 1420 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Figure 15:
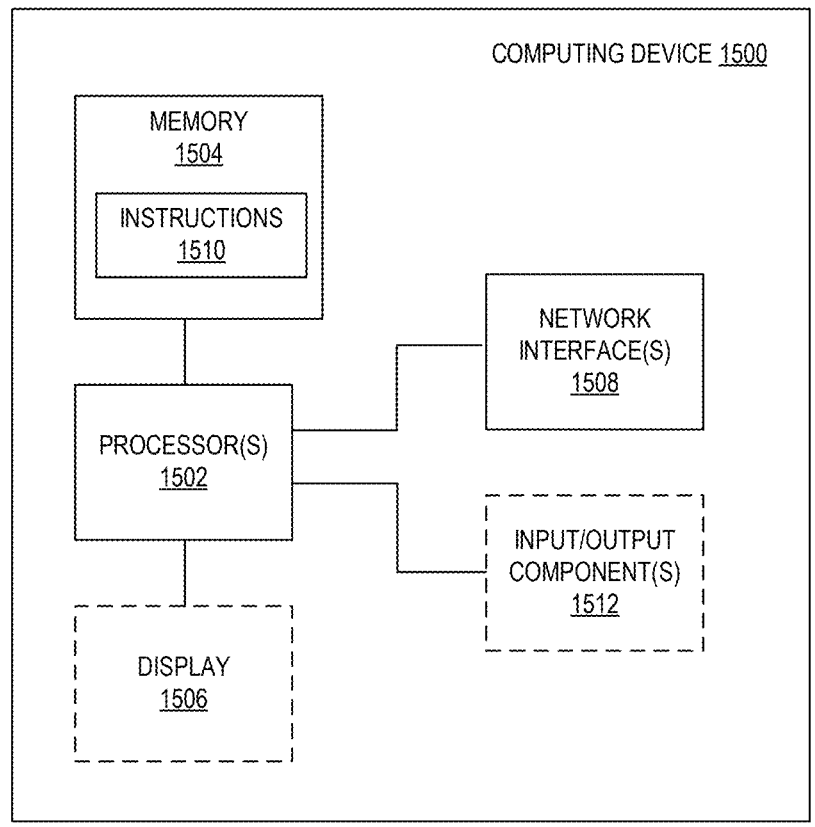
FIG. 15 illustrates a logical arrangement of a set of general components of an exemplary computing device that can be utilized in accordance with various examples.

FIG. 15 illustrates a logical arrangement of a set of general components of an example computing device 1500. Generally, a computing device 1500 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1502 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1504) to store code (for example, instructions 1510, e.g., which implement a content delivery service as disclosed herein), and a set of one or more wired or wireless network interfaces 1508 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1504) of a given electronic device typically stores code (e.g., instructions 1510) for execution on the set of one or more processors 1502 of that electronic device. One or more parts of various examples may be implemented using different combinations of software, firmware, and/or hardware.

A computing device 1500 can include some type of display element 1506, such as a touch screen or liquid crystal display (LCD), although many devices such as portable media players might convey information via other means, such as through audio speakers, and other types of devices such as server end stations may not have a display element 1506 at all. As discussed, some computing devices used in some examples include at least one input and/or output component(s) 1512 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 16:
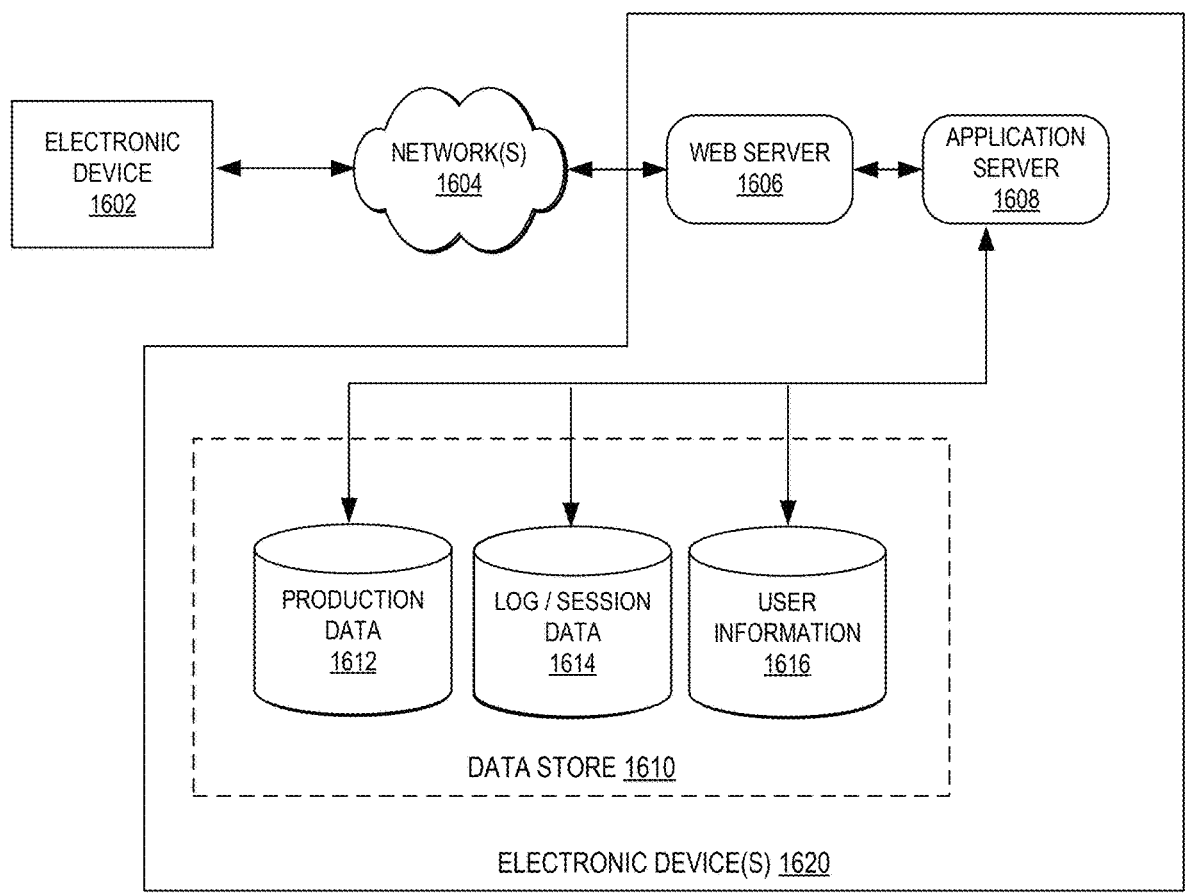
FIG. 16 illustrates an example of an environment for implementing aspects in accordance with various examples.

As discussed, different approaches can be implemented in various environments in accordance with the described examples. For example, FIG. 16 illustrates an example of an environment 1600 for implementing aspects in accordance with various examples. For example, in some examples messages are HyperText Transfer Protocol (HTTP) requests that are received by a web server (e.g., web server 1606), and the users, via electronic devices, may interact with the provider network via a web portal provided via the web server 1606 and application server 1608. As will be appreciated, although a web-based environment is used for purposes of explanation, different environments may be used, as appropriate, to implement various examples. The system includes an electronic client device 1602, which may also be referred to as a client device and can be any appropriate device operable to send and receive requests, messages, or information over an appropriate network 1604 and convey information back to a user of the device 1602. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1604 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1604 includes the Internet, as the environment includes a web server 1606 for receiving requests and serving content in response thereto, although for other networks an alternative device serving a similar purpose could be used, as would be apparent to one of ordinary skill in the art.

The illustrative environment includes at least one application server 1608 and a data store 1610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1608 can include any appropriate hardware and software for integrating with the data store 1610 as needed to execute aspects of one or more applications for the client device 1602 and handling a majority of the data access and business logic for an application. The application server 1608 provides access control services in cooperation with the data store 1610 and is able to generate content such as text, graphics, audio, video, etc., to be transferred to the client device 1602, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1602 and the application server 1608, can be handled by the web server 1606. It should be understood that the web server 1606 and application server 1608 are not required and are merely example components, as structured code discussed herein can be executed on any appropriate device or host machine as discussed elsewhere herein.

The data store 1610 can include several separate data tables, databases, or other data storage mechanisms and media for storing data relating to a particular aspect. For example, the data store illustrated includes mechanisms for storing production data 1612 and user information 1616, which can be used to serve content for the production side. The data store 1610 also is shown to include a mechanism for storing log or session data 1614. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update, or otherwise process data in response thereto. In one example, a user might submit a search request for a certain type of item. In this case, the data store 1610 might access the user information 1616 to verify the identity of the user and can access a production data 1612 to obtain information about items of that type. The information can then be returned to the user, such as in a listing of results on a web page that the user is able to view via a browser on the user device 1602. Information for a particular item of interest can be viewed in a dedicated page or window of the browser.

The web server 1606, application server 1608, and/or data store 1610 may be implemented by one or more electronic devices 1620, which can also be referred to as electronic server devices or server end stations, and may or may not be located in different geographic locations. Each of the one or more electronic devices 1620 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the environment 1600 in FIG. 16 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 1318A-1318N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," "certain examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to train a multiscale audio transformer (MAT) machine learning model to extract hierarchical audio representations;
   training the MAT machine learning model to extract hierarchical audio representations;
   receiving a request to perform an action recognition on an audio file;
   generating a first plurality of audio representations by the MAT machine learning model for an input of an audio spectrogram of the audio file;
   generating a second plurality, less than the first plurality, of audio representations by the MAT machine learning model from the first plurality of audio representations;
   generating a classification embedding and a third plurality, less than the second plurality, of audio representations by the MAT machine learning model from the second plurality of audio representations;
   generating a video inference by a multiscale video transformer (MVT) machine learning model for a video file corresponding to the audio file that includes a plurality of video representations for the video file;
   generating a plurality of multimodal audio-video tokens;
   concatenating the plurality of multimodal audio-video tokens and the third plurality of audio representations as a first input;
   concatenating the plurality of multimodal audio-video tokens and the plurality of video representations as a second input; and
   generating an updated classification embedding and an updated third plurality of audio representations and an updated plurality of video representations by a multiscale multimodal (MM) machine learning model from the first input and the second input; and
   performing the action recognition on the audio file based on the updated classification embedding and the updated third plurality of audio representations.

2. The computer-implemented method of claim 1, further comprising performing an action recognition on the video file, wherein the performing the action recognition on the audio file and the performing the action recognition on the video file are based on the updated classification embedding, the updated third plurality of audio representations, and the updated plurality of video representations.

3. A computer-implemented method comprising:
   receiving a request to perform an action recognition on an audio file;
   generating a first plurality of audio representations by a multiscale audio transformer (MAT) machine learning model, trained to extract hierarchical audio representations, for an input of the audio file;
   generating a second plurality, less than the first plurality, of audio representations by the MAT machine learning model from the first plurality of audio representations;
   generating a video inference by a multiscale video transformer (MVT) machine learning model for a video file corresponding to the audio file that includes a plurality of video representations for the video file;
   generating a plurality of multimodal audio-video tokens;
   concatenating the plurality of multimodal audio-video tokens and the second plurality of audio representations as a first input;
   concatenating the plurality of multimodal audio-video tokens and the plurality of video representations as a second input; and
   generating an updated second plurality of audio representations by a multiscale multimodal (MM) machine learning model from the first input and the second input; and
   performing the action recognition on the audio file based on the updated second plurality of audio representations.

4. The computer-implemented method of claim 3, wherein the input of the audio file is an audio spectrogram.

5. The computer-implemented method of claim 3, wherein the generating the second plurality of audio representations by the MAT machine learning model comprises reducing a temporal length of the first plurality of audio representations.

6. The computer-implemented method of claim 5, wherein the generating the second plurality of audio representations by the MAT machine learning model comprises increasing a channel dimension of the first plurality of audio representations.

7. The computer-implemented method of claim 3, wherein the generating the second plurality of audio representations by the MAT machine learning model comprises increasing a channel dimension of the first plurality of audio representations.

8. The computer-implemented method of claim 3, further comprising:
- generating an updated plurality of video representations by the multiscale multimodal (MM) machine learning model from the first input and the second input; and
- performing an action recognition on the video file, wherein the performing the action recognition on the audio file and the performing the action recognition on the video file are based on the updated second plurality of audio representations and the updated plurality of video representations.

9. The computer-implemented method of claim 8, wherein the updated second plurality of audio representations comprise a set of embedding tokens and a classification embedding vector for the audio file and the updated plurality of video representations comprise a set of embedding tokens and a classification embedding vector for the video file.

10. The computer-implemented method of claim 3, wherein the updated second plurality of audio representations comprise a set of embedding tokens and a classification embedding vector for the audio file.

11. A non-transitory computer-readable medium storing code that, when executed by a device, causes the device to perform a method comprising:
- receiving a request to perform an action recognition on an audio file;
- generating a first plurality of audio representations by a multiscale audio transformer (MAT) machine learning model, trained to extract hierarchical audio representations, for an input of the audio file;
- generating a second plurality, less than the first plurality, of audio representations by the MAT machine learning model from the first plurality of audio representations;
- generating a video inference by a multiscale video transformer (MVT) machine learning model for a video file corresponding to the audio file that includes a plurality of video representations for the video file;
- generating a plurality of multimodal audio-video tokens;
- concatenating the plurality of multimodal audio-video tokens and the second plurality of audio representations as a first input;
- concatenating the plurality of multimodal audio-video tokens and the plurality of video representations as a second input; and
- generating an updated second plurality of audio representations and an updated plurality of video representations by a multiscale multimodal (MM) machine learning model from the first input and the second input; and
- performing the action recognition on the audio file based on the updated second plurality of audio representations.

12. The non-transitory computer-readable medium of claim 11, wherein the generating the second plurality of audio representations by the MAT machine learning model comprises reducing a temporal length of the first plurality of audio representations.

13. The non-transitory computer-readable medium of claim 11, wherein the generating the second plurality of audio representations by the MAT machine learning model comprises increasing a channel dimension of the first plurality of audio representations.

14. The non-transitory computer-readable medium of claim 11, wherein the updated second plurality of audio representations comprise a set of embedding tokens and a classification embedding vector for the audio file.

15. The non-transitory computer-readable medium of claim 11, wherein the generating the second plurality of audio representations by the MAT machine learning model comprises reducing a temporal length of the first plurality of audio representations.

16. The non-transitory computer-readable medium of claim 15, wherein the generating the second plurality of audio representations by the MAT machine learning model comprises increasing a channel dimension of the first plurality of audio representations.

17. The non-transitory computer-readable medium of claim 11, wherein the generating the second plurality of audio representations by the MAT machine learning model comprises increasing a channel dimension of the first plurality of audio representations.

18. The non-transitory computer-readable medium of claim 11, wherein the method further comprises:
- generating an updated plurality of video representations by the multiscale multimodal (MM) machine learning model from the first input and the second input; and
- performing an action recognition on the video file, wherein the performing the action recognition on the audio file and the performing the action recognition on the video file are based on the updated second plurality of audio representations and the updated plurality of video representations.

19. The non-transitory computer-readable medium of claim 18, wherein the updated second plurality of audio representations comprise a set of embedding tokens and a classification embedding vector for the audio file and the updated plurality of video representations comprise a set of embedding tokens and a classification embedding vector for the video file.

20. The non-transitory computer-readable medium of claim 11, wherein the updated second plurality of audio representations comprise a set of embedding tokens and a classification embedding vector for the audio file.

* * * * *